(12) United States Patent
Imai et al.

(10) Patent No.: US 7,466,057 B2
(45) Date of Patent: Dec. 16, 2008

(54) CLAW POLE MOTOR STATOR

(75) Inventors: Nobuyuki Imai, Saitama (JP); Shin Aoki, Saitama (JP); Hiroyuki Kikuchi, Saitama (JP); Masahiro Seki, Saitama (JP); Tadanobu Takahashi, Saitama (JP); Shigeru Tajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 10/568,959

(22) PCT Filed: Sep. 16, 2004

(86) PCT No.: PCT/JP2004/013502

§ 371 (c)(1),
(2), (4) Date: Nov. 8, 2006

(87) PCT Pub. No.: WO2005/027309

PCT Pub. Date: Mar. 24, 2005

(65) Prior Publication Data

US 2007/0138900 A1   Jun. 21, 2007

(30) Foreign Application Priority Data

Sep. 16, 2004 (JP) .................... 2003-322722

(51) Int. Cl.
*H02K 1/14* (2006.01)
*H02K 37/14* (2006.01)
*H02K 3/00* (2006.01)
*H02K 9/00* (2006.01)

(52) U.S. Cl. .............. 310/257; 310/49 R; 310/185; 310/60 A

(58) Field of Classification Search ............ 310/49 R, 310/217, 257, 184–185, 59, 60 A
See application file for complete search history.

(56) References Cited

U.S. PATENT DOCUMENTS

| 3,750,151 | A | * | 7/1973 | Dill | .................. | 340/319 |
| 6,121,712 | A | * | 9/2000 | Sakamoto | .................. | 310/254 |
| 6,765,321 | B2 | * | 7/2004 | Sakamoto | .................. | 310/49 R |

(Continued)

FOREIGN PATENT DOCUMENTS

JP  52-100512 U  7/1977

(Continued)

*Primary Examiner*—Tran Nguyen
(74) *Attorney, Agent, or Firm*—Arent Fox LLP

(57) ABSTRACT

2m sets (m being a natural number of 2 or more; and m=2 in embodiments) of teeth (31b to 34b) and 2m−1 slots (41, 42, 43) are disposed alternately in an axial direction; those of windings (36, 37, 38) accommodated in the slots (41, 42, 43), which are each accommodated in the slots (41, 42, 43) spaced apart by m from each other, are connected in line, so that exciting directions are opposite; and phases of magnetic fluxes passed through the teeth (31b to 34b) are displaced by 360°/2m from one another. Therefore, a thin and high-powered claw pole motor can be produced by disusing a portion of the winding which does not contribute to a torque (i.e., a crossover portion) and commonly using a magnetic path in each phase through return passes (31a to 34a). Moreover, a magnetic circuit of a wave winding motor is formed and hence, the output torque can be increased, as compared with a salient pole concentrated winding motor.

14 Claims, 30 Drawing Sheets

U.S. PATENT DOCUMENTS

| | | | |
|---|---|---|---|
| 6,946,771 B2 * | 9/2005 | Cros et al. | 310/257 |
| 7,135,802 B2 * | 11/2006 | Seki et al. | 310/257 |
| 2002/0070627 A1 * | 6/2002 | Ward et al. | 310/254 |
| 2006/0197397 A1 * | 9/2006 | Takahashi et al. | 310/185 |

FOREIGN PATENT DOCUMENTS

| | | |
|---|---|---|
| JP | 60-181178 U | 12/1985 |
| JP | 7-227075 A | 8/1995 |
| JP | 11-55928 A | 2/1999 |

* cited by examiner

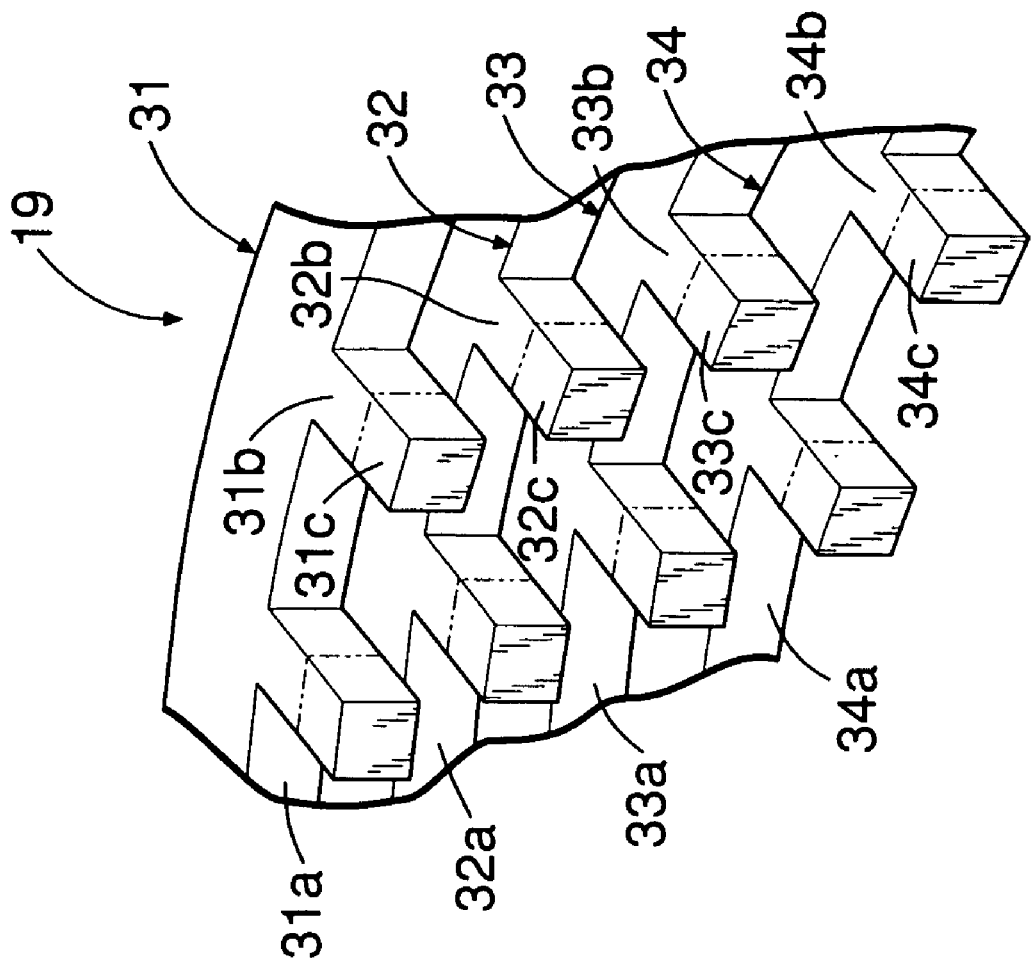
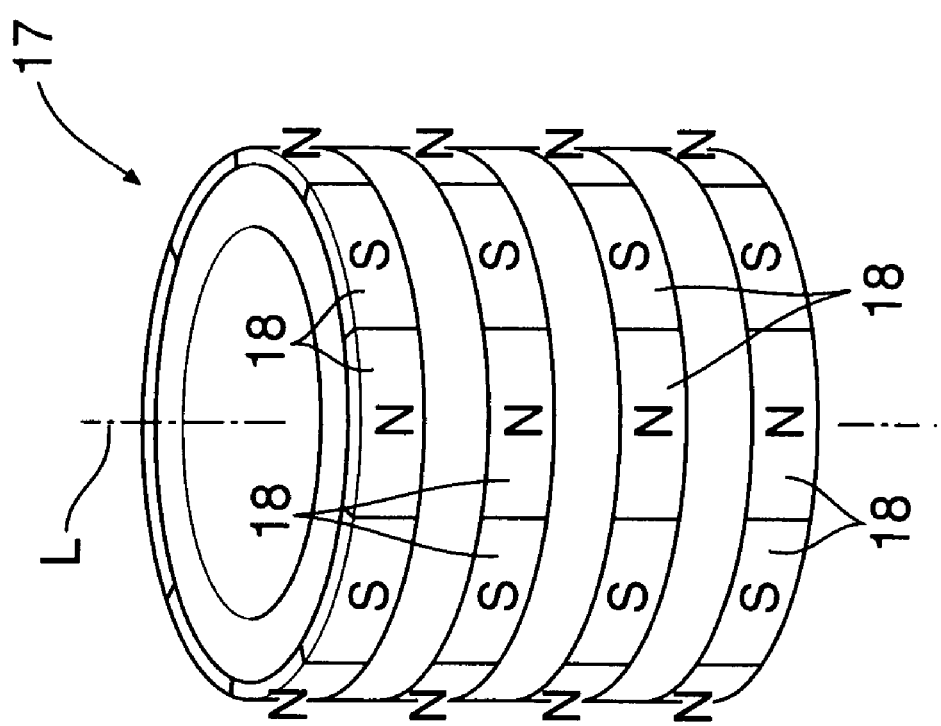

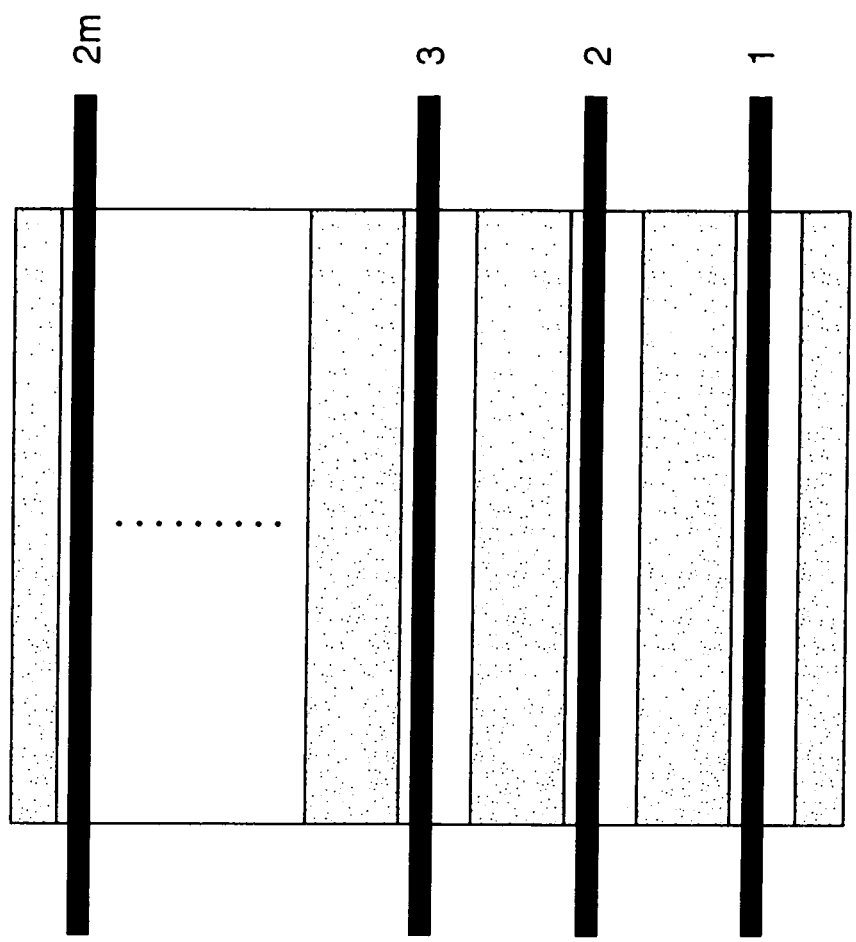
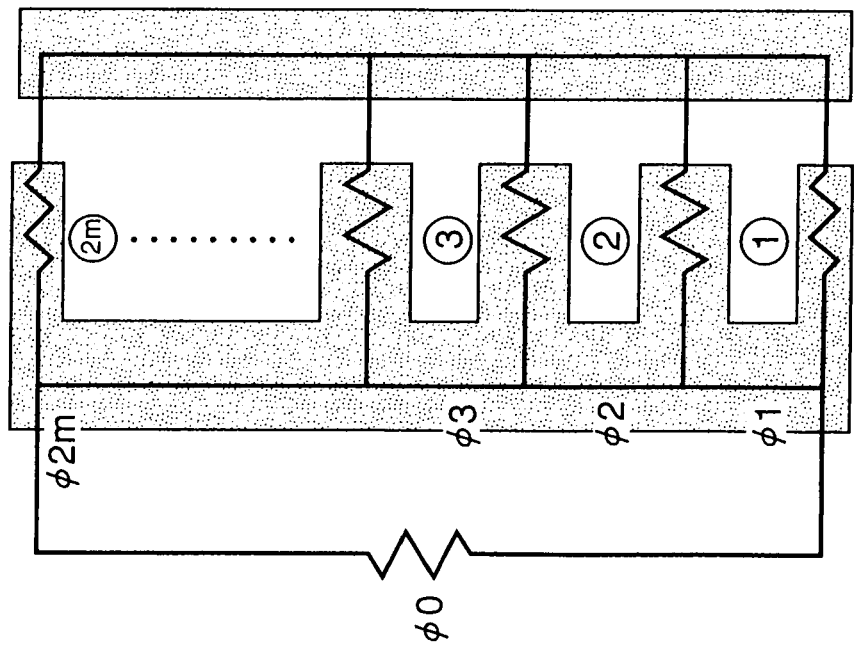
FIG. 17

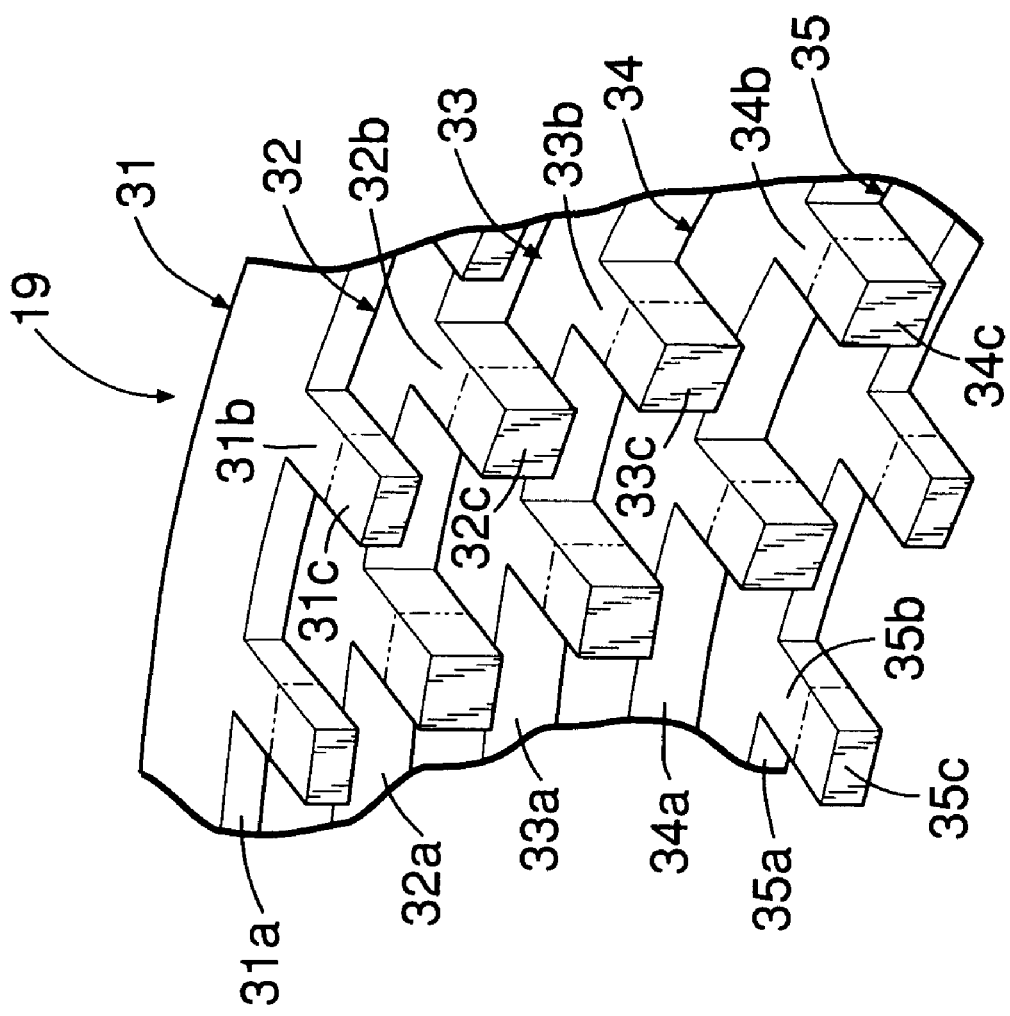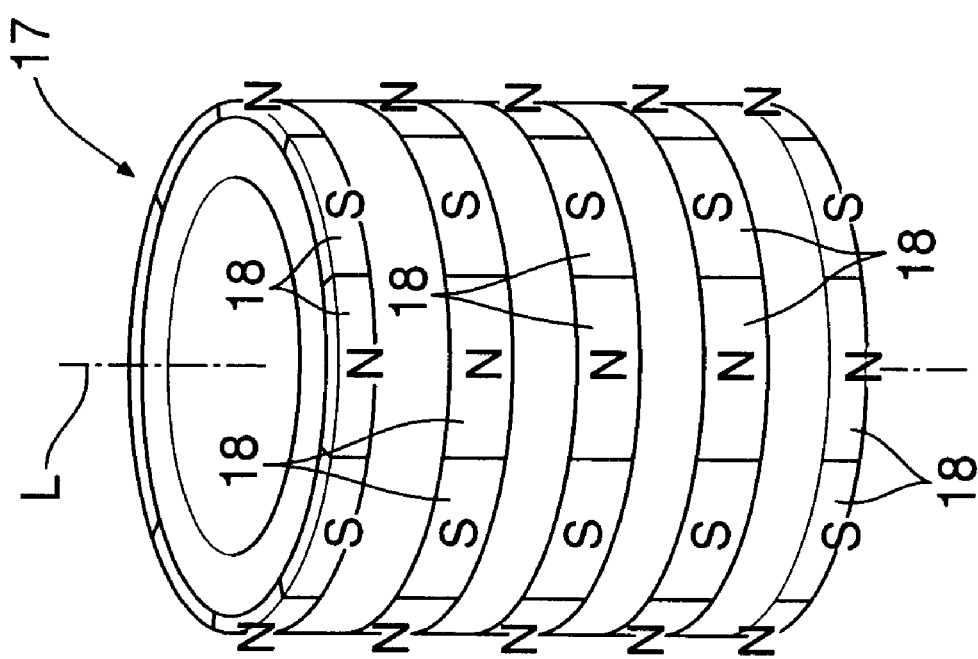

CHANGE IN MAGNETIC FLUX LINKED TO b

120°

CHANGE IN MAGNETIC FLUX LINKED TO a

EXCITING DIRECTIONS IN a AND b ARE OPPOSITE AND HENCE, VECTORS OF CHANGE IN MAGNETIC FLUX LINKED TO b ARE IN OPPOSITE DIRECTIONS. MAGNITUDE OF RESULTANT VECTOR IS $\sqrt{3}$

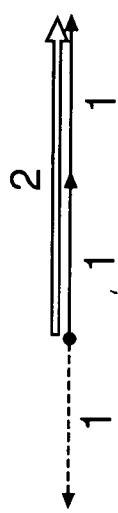

DISTRIBUTION OF MAGNETOMOTIVE FORCE IN DISTRIBUTED WINDING

DISTRIBUTION OF MAGNETOMOTIVE FORCE IN CONCENTRATED WINDING

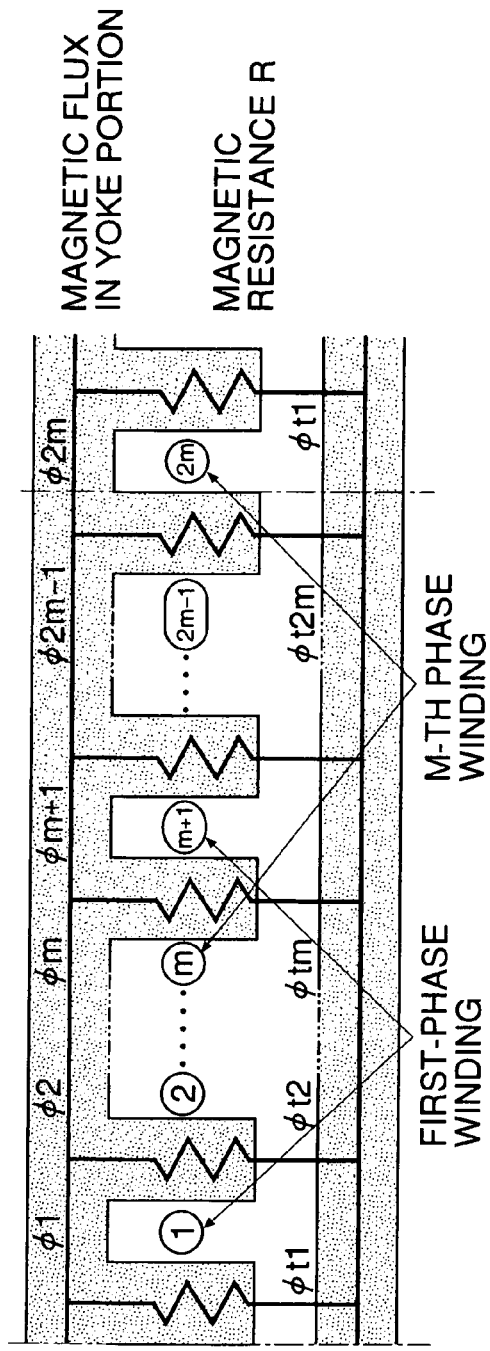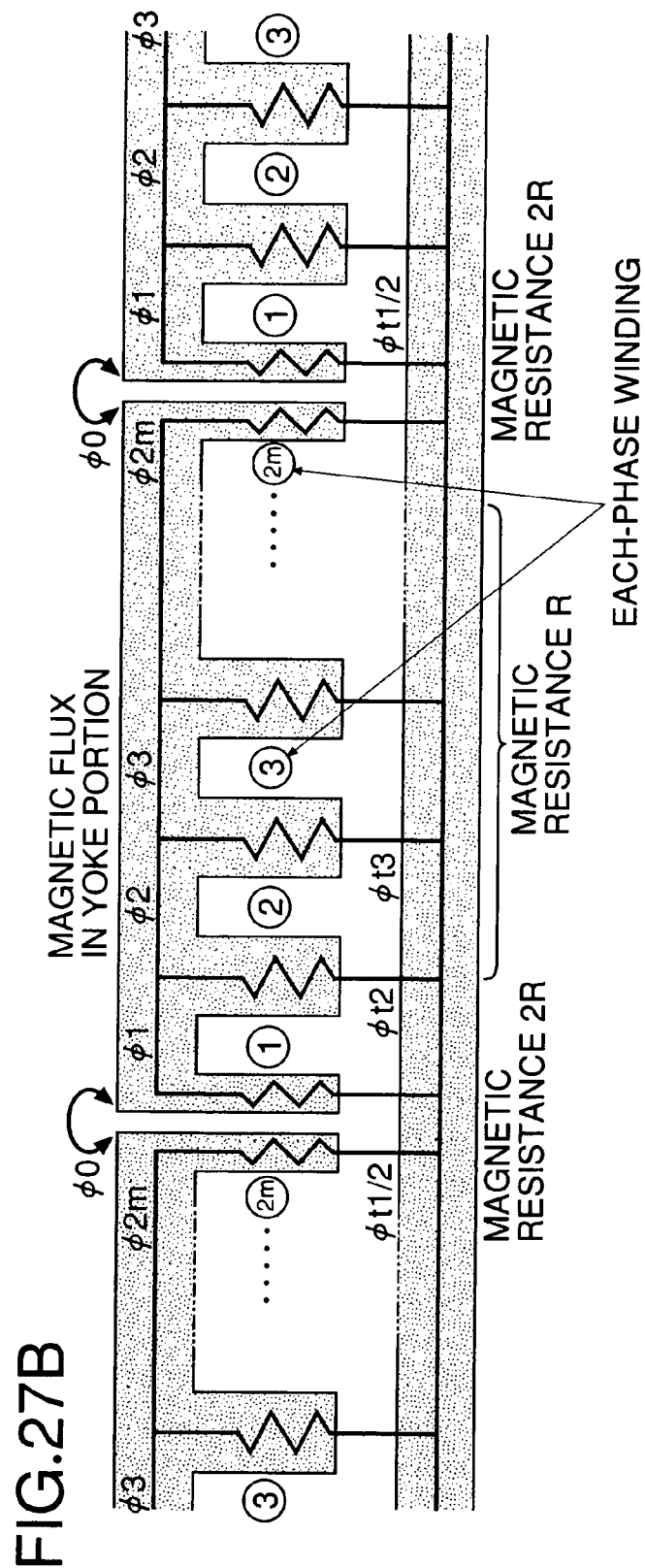
FIG.27A
FIG.27B

CLAW POLE MOTOR STATOR

CROSS-REFERENCE TO RELATED APPLICATION

This application is a National Stage entry of International Application No. PCT1JP20041013502, filed Sep. 16, 2004, the entire specification claims and drawings of which are incorporated herewith by reference.

TECHNICAL FIELD

The present invention relates to a claw pole motor stator, in which a plurality of windings wound in a plane perpendicular to an axis are housed in a plurality of slots defined between adjacent ones of a plurality of teeth juxtaposed in an axial direction.

BACKGROUND ART

Such a type of a claw pole motor stator is known from the following patent document 1. This stator arrangement includes three stator units in correspondence to a U-phase, a V-phase and a W-phase. Each stator unit is formed into a substantially U-shape in section and includes two sets of teeth axially spaced apart from each other and a return pass interconnecting the teeth at diametrically outer ends. By supplying electric current to annular windings accommodated within the stator units having the U-shaped in section to form independent magnetic paths, two types of projections of different polarities are provided on diametrically inner ends of the two sets of teeth so as to be opposed to a rotor, and are magnetized.

Patent Document 1: Japanese Patent Application Laid-open No. 7-227075

DISCLOSURE OF THE INVENTION

Problems to be Solved by the Invention

In the above-described conventional stator, the three stator units in the U-, V- and W-phases are stacked together in the axial direction to form the stator. However, the conventional stator suffers from the following problem: Each of the stator units has the annular slot in which the winding is accommodated, and the two sets of teeth and the two types of the projections. For this reason, the thickness in the axial direction is increased, and the axial dimension of the stator formed by the stacking of the three stator units is increased. Another problem is that the magnetic paths in the stator units in the phases are independent from one another and hence, the magnetic paths cannot be utilized effectively.

Particularly, when this type of motor is disposed between an engine and a transmission in a hybrid vehicle, it is desired that the thickness of the motor be decreased to the utmost, but it is difficult to meet such desire, because the conventional stator is thicker.

The present invention has been accomplished with the above-described circumstances in view, and it is an object of the present invention to ensure that the axial thickness of the stator is decreased to the utmost, while ensuring an output torque from the claw pole motor.

Means for Solution of Problems

To achieve the above object, according to a first aspect and feature of the present invention, there is proposed a claw pole motor stator, comprising 2m sets of teeth and 2m−1 of slots disposed alternately in an axial direction (m being a natural number of 2 or more), return passes interconnecting the teeth, and windings accommodated in the slots, respectively, the windings each accommodated in the slots spaced apart by m from each other being connected in line, so that exciting directions are opposite, and the phases of magnetic fluxes passed through the teeth being displaced by 360°/N (N=2m) from one another.

According to a second aspect and feature of the present invention, there is proposed a claw pole motor stator, comprising 2m+1 sets of teeth and 2m of slots disposed alternately in an axial direction (m being a natural number of 2 or more), return passes interconnecting the teeth, and windings accommodated in the slots, respectively, the windings each accommodated in the slots spaced apart by m from each other being connected in line, so that exciting directions are opposite, the phases of magnetic fluxes passed through the teeth being displaced by 360°/N (N=2m) from one another, and magnetic fluxes passed through the first one of the teeth and 2m+1-th one of the teeth being 2/1 of those passed through the other teeth at the same phase.

According to a third aspect and feature of the present invention, in addition to the first or second feature, when N=2Km, wherein K is a natural number of 2 or more, K windings disposed continuously are connected in line.

According to a fourth aspect and feature of the present invention, in addition to the first or second feature, the teeth have projections displaced in phase by 360°/N from one another.

According to a fifth aspect and feature of the present invention, in addition to the fourth feature, the projections extend axially along an outer peripheral surface of a rotor.

According to a sixth aspect and feature of the present invention, in addition to the first or second feature, the teeth have projections of the same phase relative to a rotor having magnetic poles displaced in phase by 360°/N from one another.

According to a seventh aspect and feature of the present invention, in addition to the second feature, first one and 2m+1-th one of the teeth have projections of the same length extending axially along an outer peripheral surface of a rotor.

According to an eighth aspect and feature of the present invention, in addition to the first or second feature, the stator includes a cooling structure.

According to a ninth aspect and feature of the present invention, in addition to the eighth feature, the cooling structure is provided in at least one of the inside and the peripheral portion of the stator.

According to a tenth aspect and feature of the present invention, in addition to the ninth feature, the cooling structure provided in the peripheral portion of the stator comprises at least one recess, at least one protrusion or a plurality of cooling fins.

According to an eleventh aspect and feature of the present invention, in addition to the ninth feature, the cooling structure provided in the inside of the stator has at least one cooling space.

According to a twelfth aspect and feature of the present invention, in addition to the eleventh feature, the cooling space is formed by cooperation of the stator and a holder for the stator with each other.

According to a thirteenth aspect and feature of the present invention, in addition to the eleventh feature, the cooling space is formed by cooperation of the stator, a holder for the stator, and a reinforcing ring interposed between the stator and the holder.

According to a fourteenth aspect and feature of the present invention, in addition to the eighth feature, the cooling structure cools the stator by at least one of cooling water and cooling air.

EFFECT OF THE INVENTION

With the first feature, the 2m sets of teeth and the 2m−1 slots are disposed alternately in the axial direction, and those of the windings accommodated in the slots, which are each accommodated in the slots spaced apart by m from each other, are connected in line, so that exciting directions are opposite, and the magnetic fluxes passed through the teeth are displaced in phase by 360°/N from one another. Therefore, a portion of the winding which does not contribute to a torque (i.e., a crossover portion) is disused, and the magnetic path in each phase is commonly used or shared through the return passes, whereby a thin and high-powered motor can be provided. Moreover, a magnetic circuit of a wave winding motor is formed and hence, the output torque can be increased, as compared with a salient pole concentrated winding motor.

With the second feature, the 2m+1 sets of teeth and the 2m slots are disposed alternately in the axial direction; those of the windings accommodated in the slots, which are each accommodated in the slots spaced apart by m from each other, are connected in line, so that exciting directions are opposite, and the magnetic fluxes passed through the teeth are displaced in phase by 360°/N from one another; and magnetic fluxes passed through the first one of teeth and 2m+1-th one of teeth being 2/1 of those passed through the other teeth at the same phase. Therefore, a thin and high-powered motor can be produced by disusing a portion of the winding which does not contribute to a torque (i.e., a cross over portion) and commonly using a magnetic path in each phase through the return passes. Moreover, a magnetic circuit of a wave winding motor is formed and hence, the output torque can be increased, as compared with a salient pole concentrated winding motor.

With the third feature, when N=2Km wherein K is a natural number of 2 or more, the K windings disposed continuously are connected in line. Therefore, the distribution of a magnetomotive force in the distributed winding can be realized to reduce a torque ripple and a core loss.

With the fourth feature, the teeth have the projections displaced in phase by 360°/N from one another. Therefore, the phases of magnetic poles of a rotor can be uniformized, leading to a simplified structure, and an air gap between the projections and the rotor can be reduced to increase the output torque from the rotor.

With the fifth feature, the projections extend axially along the outer peripheral surface of the rotor and hence, a magnetic flux generated by the rotor can be utilized effectively to increase the output torque.

With the sixth feature, the teeth have the projections of the same phase relative to a rotor having magnetic poles displaced in phase by 360°/N from one another. Therefore, the phases of the projection of the stator can be uniformized, leading to a simplified structure, an air gap between the projections and the rotor can be reduced to increase the output torque from the rotor.

With the seventh feature, first one and 2m+1-th one of the teeth have projections of the same length extending axially along the outer peripheral surface of the rotor. Therefore, the sum total of magnetic fluxes passed through first one and 2m+1-th one of the teeth can be equalized with those passed through the other teeth.

With the eighth feature, the stator includes a cooling structure and hence, it is possible to prevent a rise in temperature of coils due to the generation of heat therein during operation of the motor.

With the ninth feature, the cooling structure is provided in at least one of the inside and the peripheral portion of the stator and hence, the stator can be cooled effectively.

With the tenth feature, the cooling structure provided in the peripheral portion of the stator is formed of the recess, the protrusion or the plurality of cooling fins. Therefore, the area of contact between a refrigerant and the stator can be increased to enhance the cooling effect.

With the eleventh feature, the cooling structure provided in the inside of the stator is formed of the cooling space. Therefore, a refrigerant can be allowed to flow through the cooling space to enhance the stator-cooling effect.

With the twelfth feature, the cooling space is formed by cooperation of the stator and the holder with each other and hence, the cooling space of a large volume can be formed without detracting the strength of the stator.

With the thirteenth feature, the cooling space is formed by cooperation of the stator, the holder and the reinforcing ring interposed between the stator and the holder. Therefore, the cooling space of a large volume can be formed without detracting the strength of the stator, and moreover, the stator can be reinforced effectively by the reinforcing ring.

With the fourteenth feature, the cooling structure cools the stator by cooling water or cooling air. Therefore, a special refrigerant is not required, leading to a reduction in cost.

The above and other objects, features and advantages of the invention will become apparent from the following description of the preferred embodiment taken in conjunction with the accompanying drawings.

BRIEF DESCRIPTION OF THE DRAWINGS

FIG. 1 is a view showing a power unit of a hybrid vehicle provided with a claw pole motor (Embodiment 1);

FIG. 2 is an enlarged sectional view taken along a line 2-2 in FIG. 1 (Embodiment 1);

FIG. 3 is a sectional view taken along a line 3-3 in FIG.2 (Embodiment 1);

FIG. 4 is a sectional view taken along a line 4-4 FIG. 2 (Embodiment 1);

FIG. 5 is a sectional view taken along a line 5-5 FIG. 2 (Embodiment 1);

FIG. 6 is a sectional view taken along a line 6-6 in FIG. 2 (Embodiment 1);

FIG. 7 is a partially broken perspective view of a stator and a rotor (Embodiment 1);

FIG. 8 is an exploded perspective view of the stator and the rotor (Embodiment 1);

FIG. 9A-9B is an equivalent circuit of an m-phase wave winding claw pole motor (Embodiment 1);

FIG. 10 is a partially broken perspective view of a stator and a rotor of a 2-phase claw pole motor (Embodiment 2);

FIG. 11 is an exploded perspective view of the stator and the rotor (Embodiment 2);

FIG. 12 is a sectional view taken along a line 12-12 in FIG. 10 (Embodiment 2);

[FIG. 13A] FIG. 13A is a diagrammatic illustration of a stator and a rotor of a 2-phase claw pole motor according to a third embodiment of the present invention (Embodiment 3);

[FIG. 13B] FIG. 13B is a diagrammatic illustration of the stator and the rotor of the 2-phase claw pole motor according to the third embodiment of the present invention (Embodiment 3);

FIG. 14 is a partially broken perspective view of a stator and a rotor of a 2-phase claw pole motor (Embodiment 4);

FIG. 15 is an exploded perspective view of the stator and the rotor (Embodiment 4);

FIG. 16 is a sectional view taken along a line 16-16 in FIG. 14 (Embodiment 4);

Figure 18:
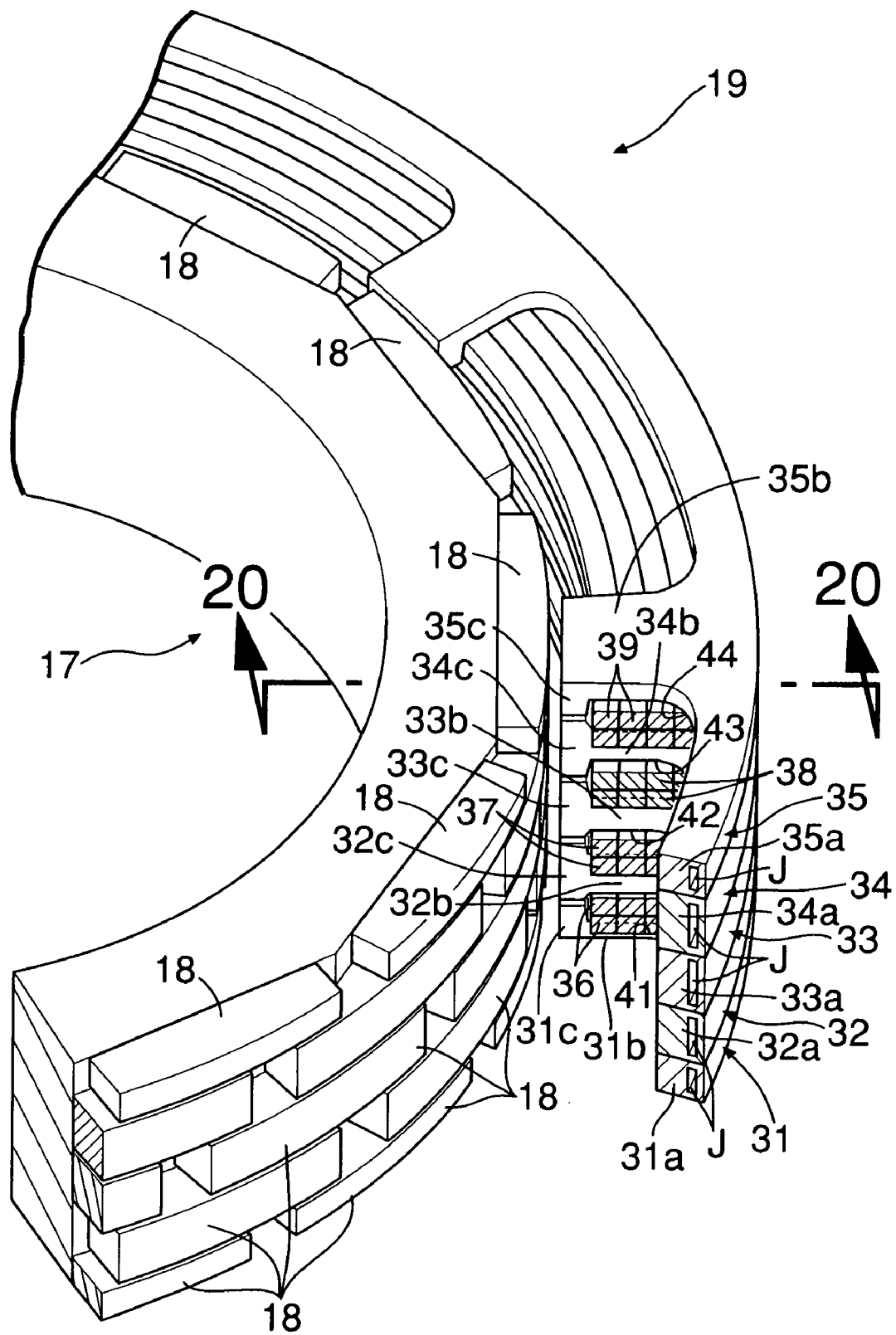
Figure 19:
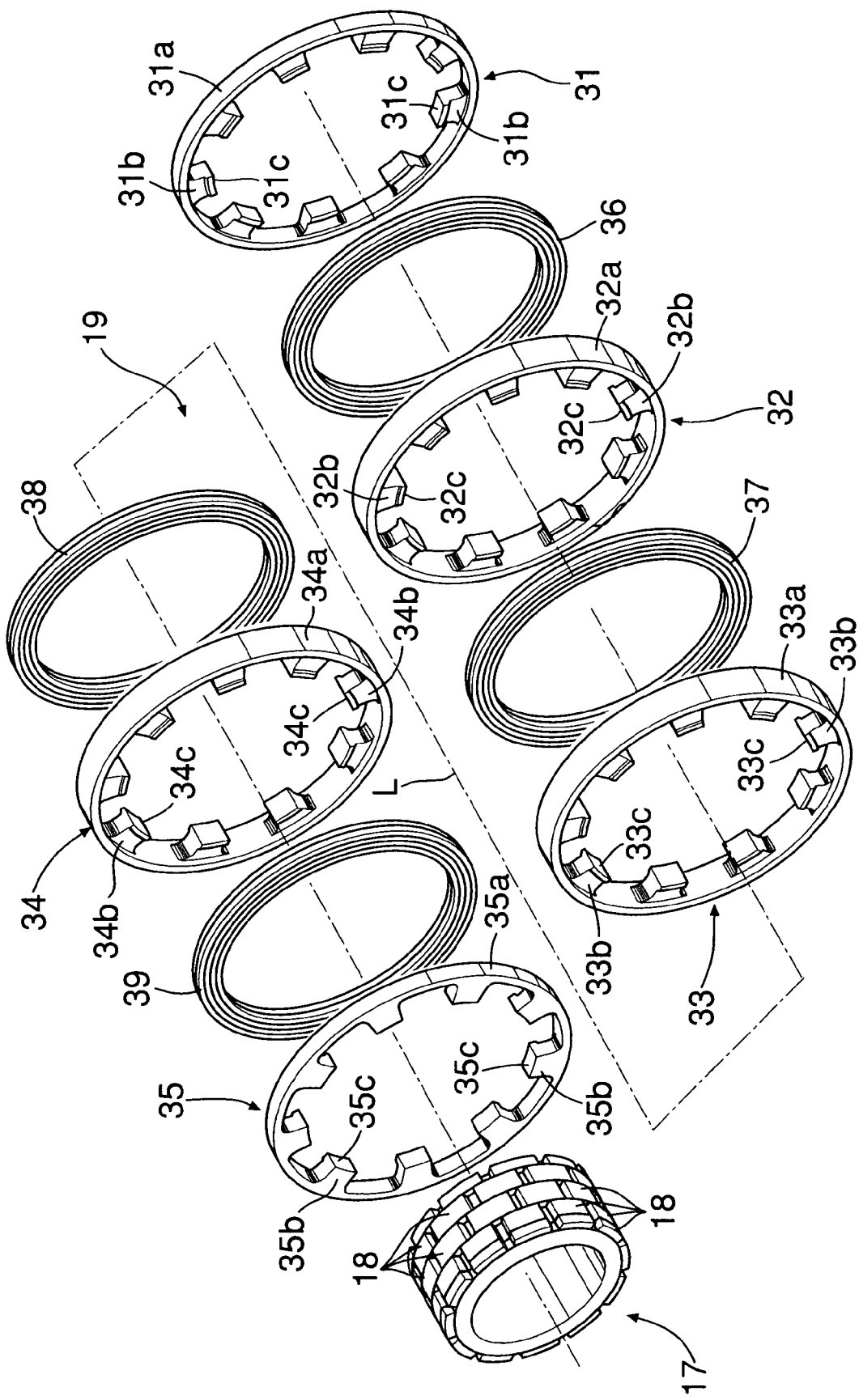
Figure 20:
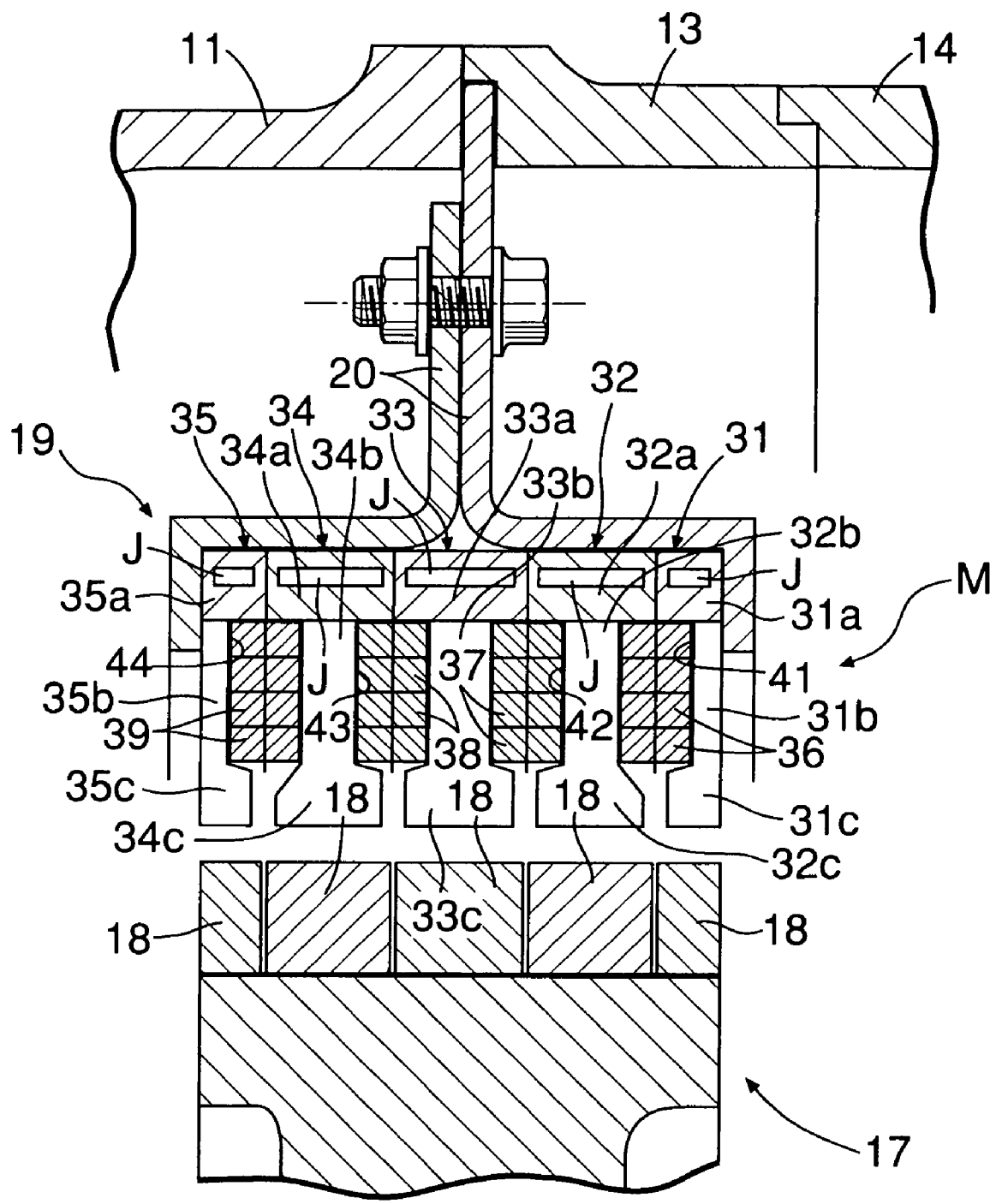
Figure 22:
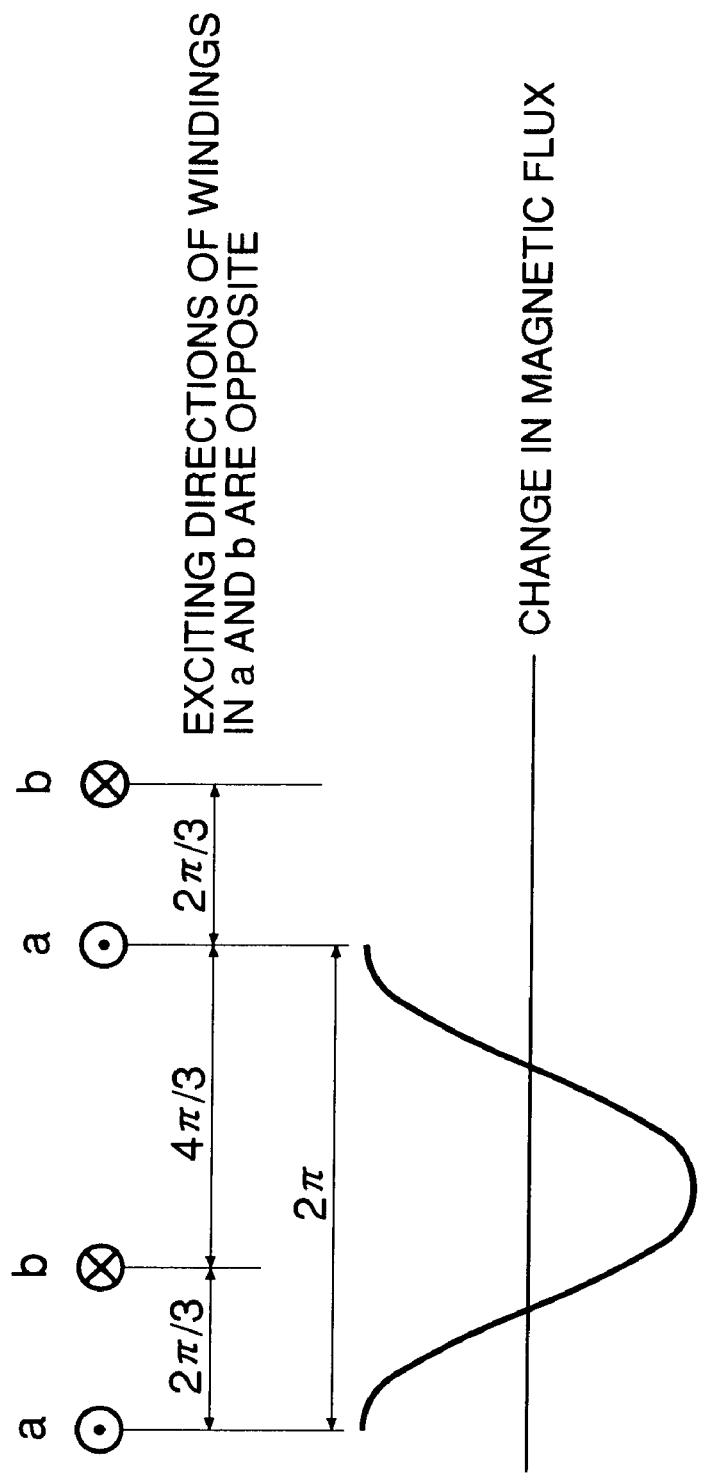
Figure 23A:
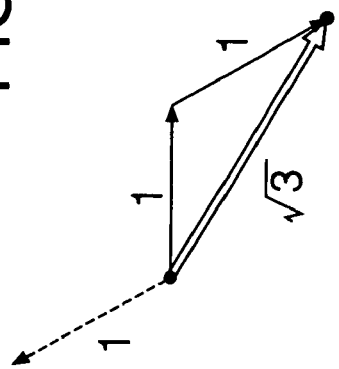
Figure 23B:
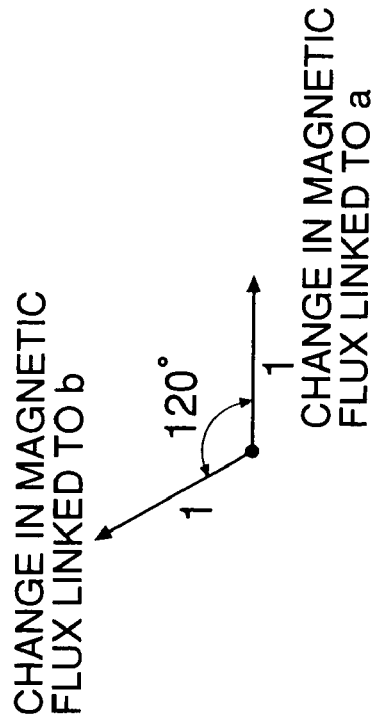
Figure 24:
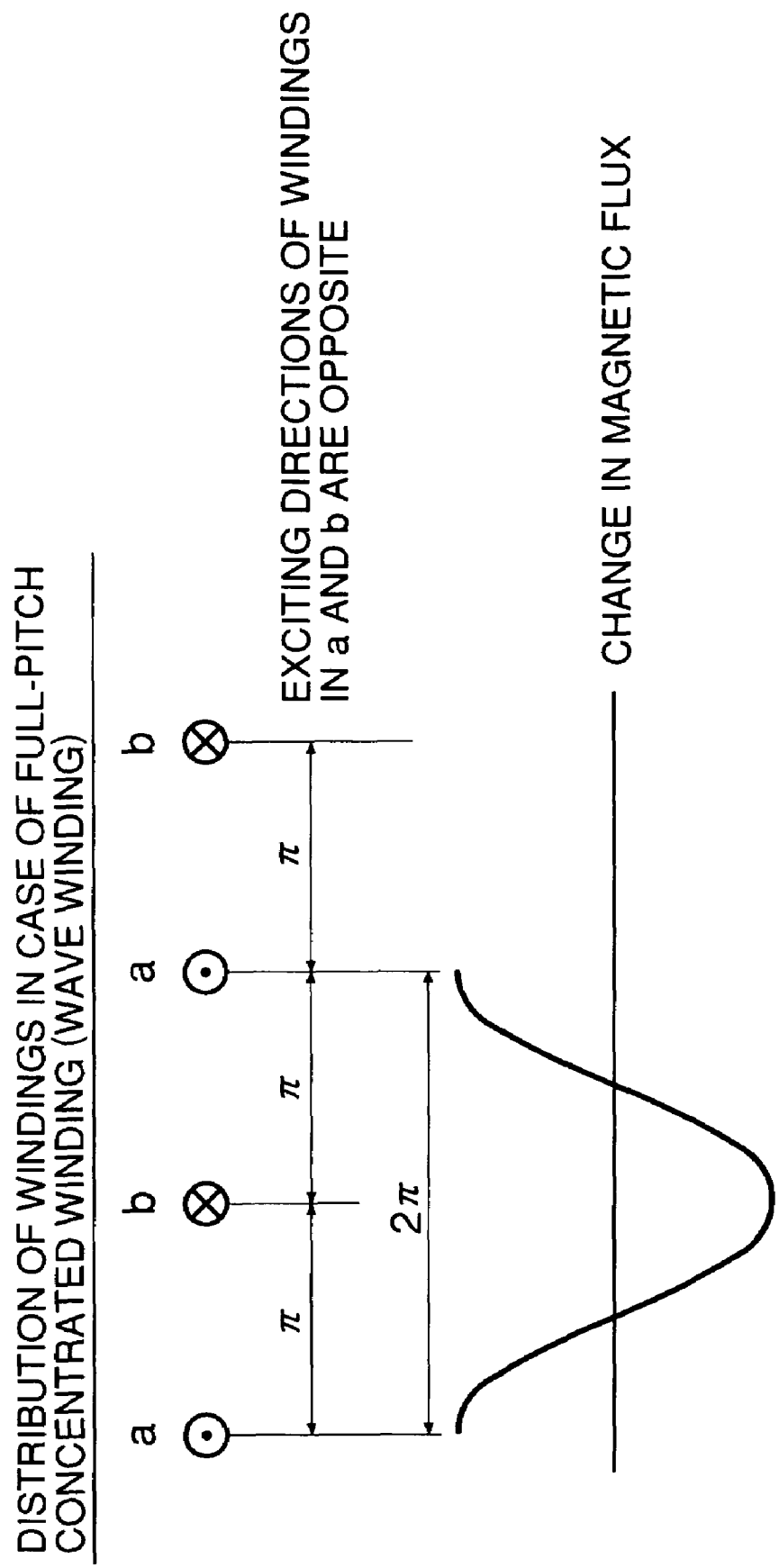
Figure 26B:
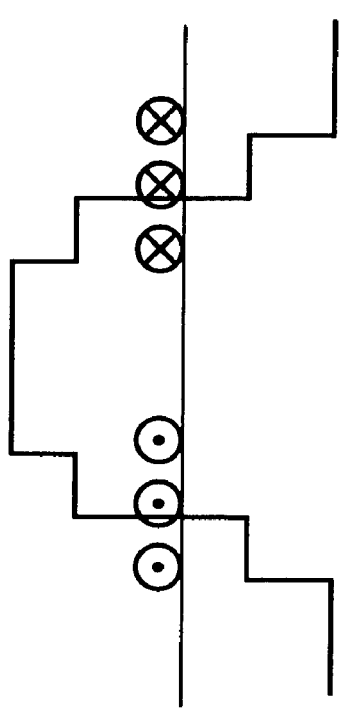
Figure 26A:
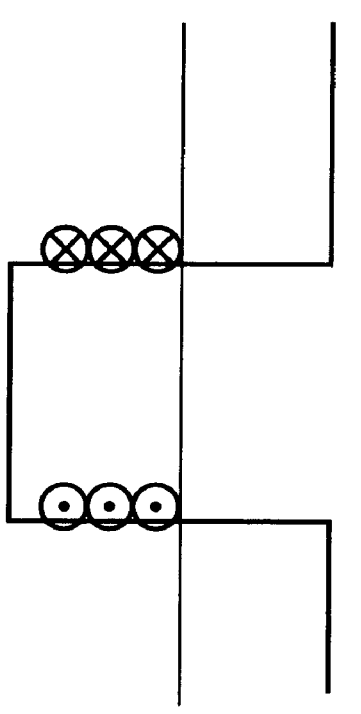
Figure 28A:
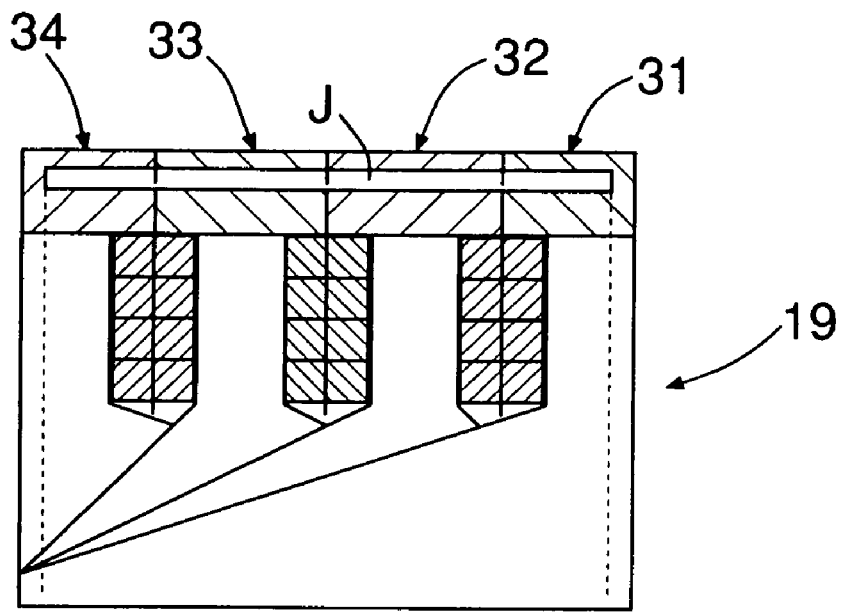
Figure 28B:
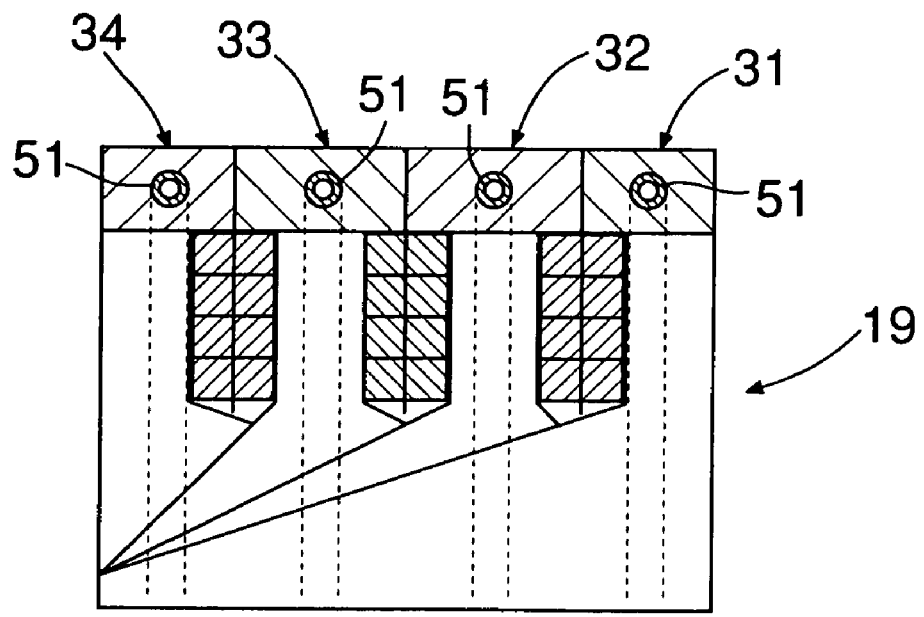
Figure 29C:
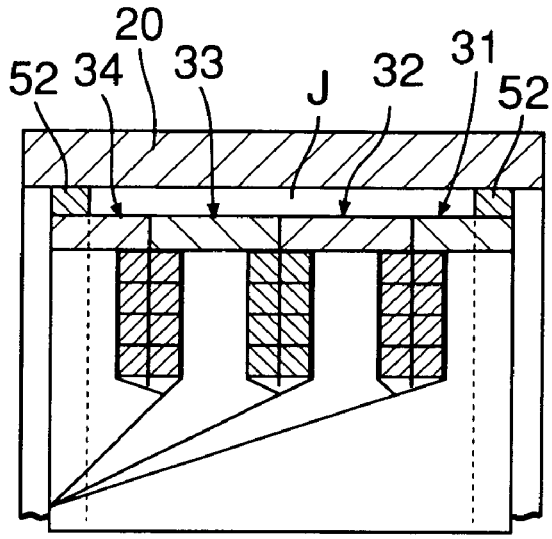
Figure 29A:
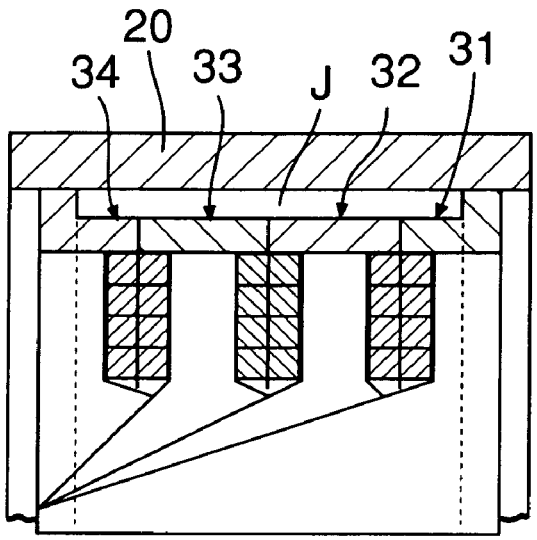
Figure 29D:
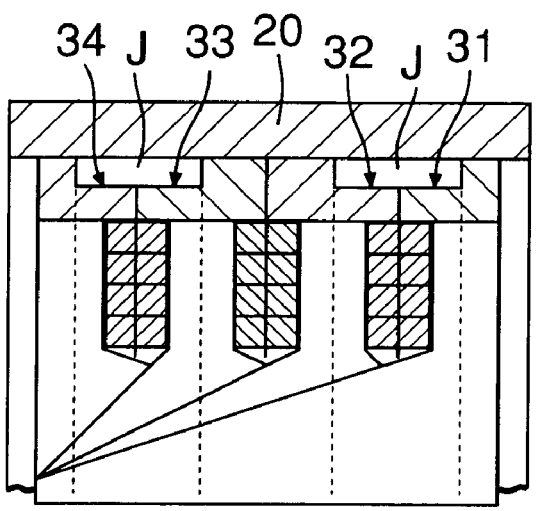
Figure 29B:
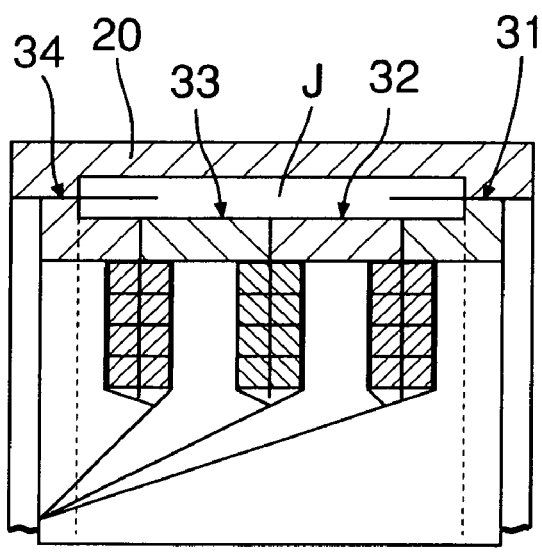
Figure 30A:
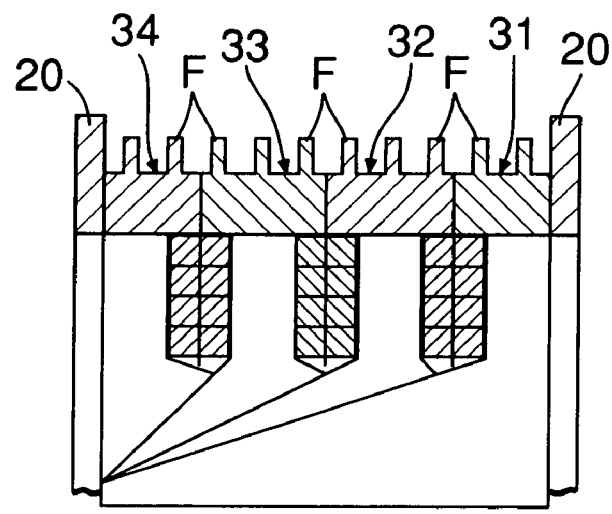
Figure 30C:
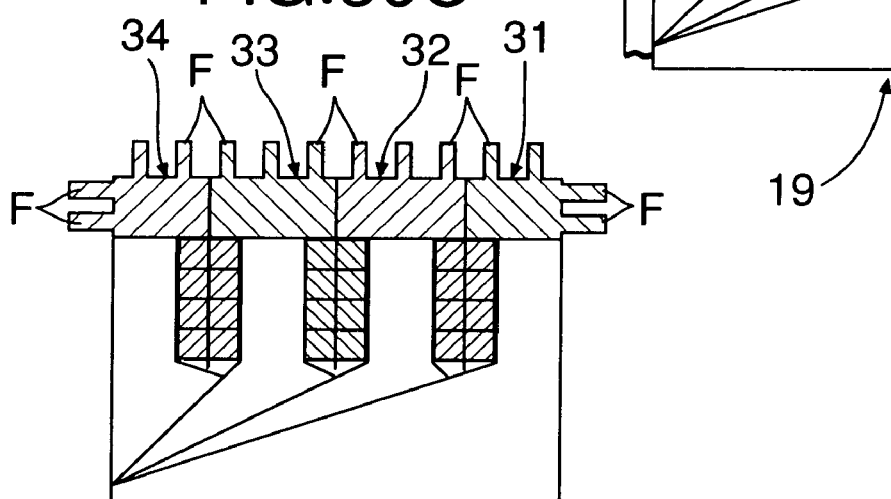
Figure 30B:
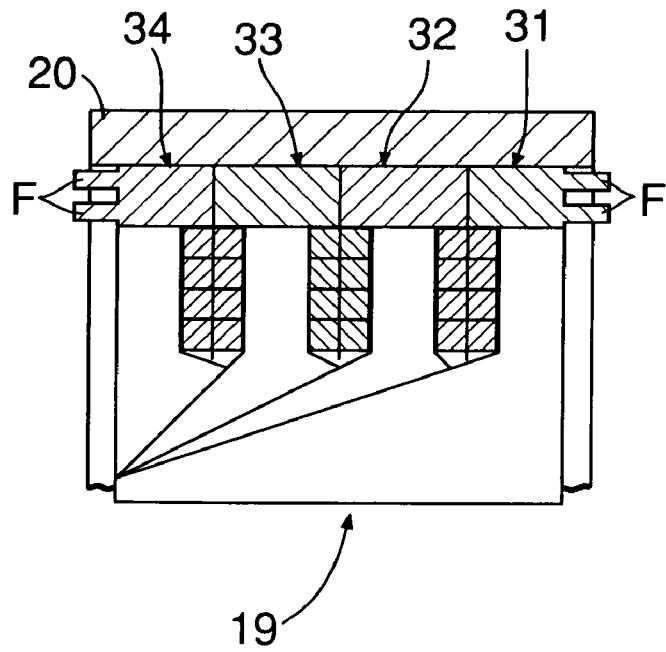

FIG. [17A-17B] Fig .17A-17B is an equivalent circuit diagram of an m-phase wave winding claw pole motor (Embodiment 4);

[FIG. 18] FIG. 18 is a partially broken perspective view of a stator and a rotor of a 2-phase claw pole motor (Embodiment 5);

[FIG. 19] FIG. 19 is an exploded perspective view of the stator and rotor (Embodiment 5);

[FIG. 20] FIG. 20 is a sectional view taken along a line 20-20 in FIG. 18 (Embodiment 5);

[FIG. 21A] FIG. 21A is a diagrammatic illustration of a stator and a rotor of a 2-phase claw pole motor according to a sixth embodiment of the present invention (Embodiment 6);

[FIG. 21B] FIG. 21B is a diagrammatic illustration of the stator and the rotor of the 2-phase claw pole motor according to the sixth embodiment of the present invention (Embodiment 6);

[FIG. 22] FIG. 22 is a diagram showing the distribution of windings in a short-pitch concentrated winding (a salient concentrated winding);

[FIG. 23A] FIG. 23A is a diagram for explaining an electromotive force of the windings in the short-pitch concentrated winding (the salient concentrated winding);

[FIG. 23B] FIG. 23B is a diagram for explaining an electromotive force of the windings in the short-pitch concentrated winding (the salient concentrated winding);

[FIG. 24] FIG. 24 is a diagram showing the distribution of windings in a full-pitch concentrated winding (a wave winding);

[FIG. 25A] FIG. 25A is a diagram for explaining an electromotive force of the windings in the full-pitch concentrated winding (the wave winding);

[FIG. 25B] FIG. 25B is a diagram for explaining an electromotive force of the windings in the full-pitch concentrated winding (the wave winding);

[FIG. 26A] FIG. 26A is a diagram showing the distribution of a magnetomotive force in each of a concentrated winding and a distributed winding;

[FIG. 26B] FIG. 26B is a diagram showing the distribution of a magnetomotive force in each of a concentrated winding and a distributed winding;

[FIG. 27A] FIG. 27A is an equivalent circuit diagram of an m-phase wave winding motor;

[FIG. 27B] FIG. 27B is an equivalent circuit diagram of the m-phase wave winding motor;

[FIG. 28A] FIG. 28A is a diagram showing another embodiment of a refrigerant passage;

[FIG. 28B] FIG. 28B is a diagram showing another embodiment of a refrigerant passage;

[FIG. 29A] FIG. 29A is a diagram showing a further embodiment of a refrigerant passage;

[FIG. 29B] FIG. 29B is a diagram showing a yet further embodiment of a refrigerant passage;

[FIG. 29C] FIG. 29C is a diagram showing a yet further embodiment of a refrigerant passage;

[FIG. 29D] FIG. 29D is a diagram showing a yet further embodiment of a refrigerant passage;

[FIG. 30A] FIG. 30A is a diagram showing an embodiment including cooling fins;

[FIG. 30B] FIG. 30B is a diagram showing an embodiment including cooling fins; and

[FIG. 30C] FIG. 30C is a diagram showing an embodiment including cooling fins.

DESCRIPTION OF REFERENCE NUMERALS AND CHARACTERS

17 Rotor
31$a$ Return pass
31$b$ Teeth
31$c$ Projection
32$a$ Return pass
32$b$ Teeth
32$c$ Projection
33$a$ Return pass
33$b$ Teeth
33$c$ Projection
34$a$ Return pass
34$b$ Teeth
34$c$ Projection
35$a$ Return pass
35$b$ Teeth
35$c$ Projection
36 Winding
37 Winding
38 Winding
39 Winding
41 Slot
42 Slot
43 Slot
44 Slot
52 Reinforcing ring
F Cooling fin
J Refrigerant passage
L Axis

BEST MODE FOR CARRYING OUT THE INVENTION

A first embodiment of the present invention will now be described with reference to FIGS. 1 to 9, 27A and 27B.

Embodiment 1

FIG. 27A shows a magnetic circuit of a conventional common m-phase wave winding motor. Here, m is a natural number of 2 or more, and each of windings in each phase are passed in a wave shape through slots spaced apart from each other by m, so that exciting directions are opposite from each other. In this case, a flux linkage of a winding in a k-th phase ($1 \leq k \leq m$) is represented by $\phi k - \phi k + m$.

Figure 9:
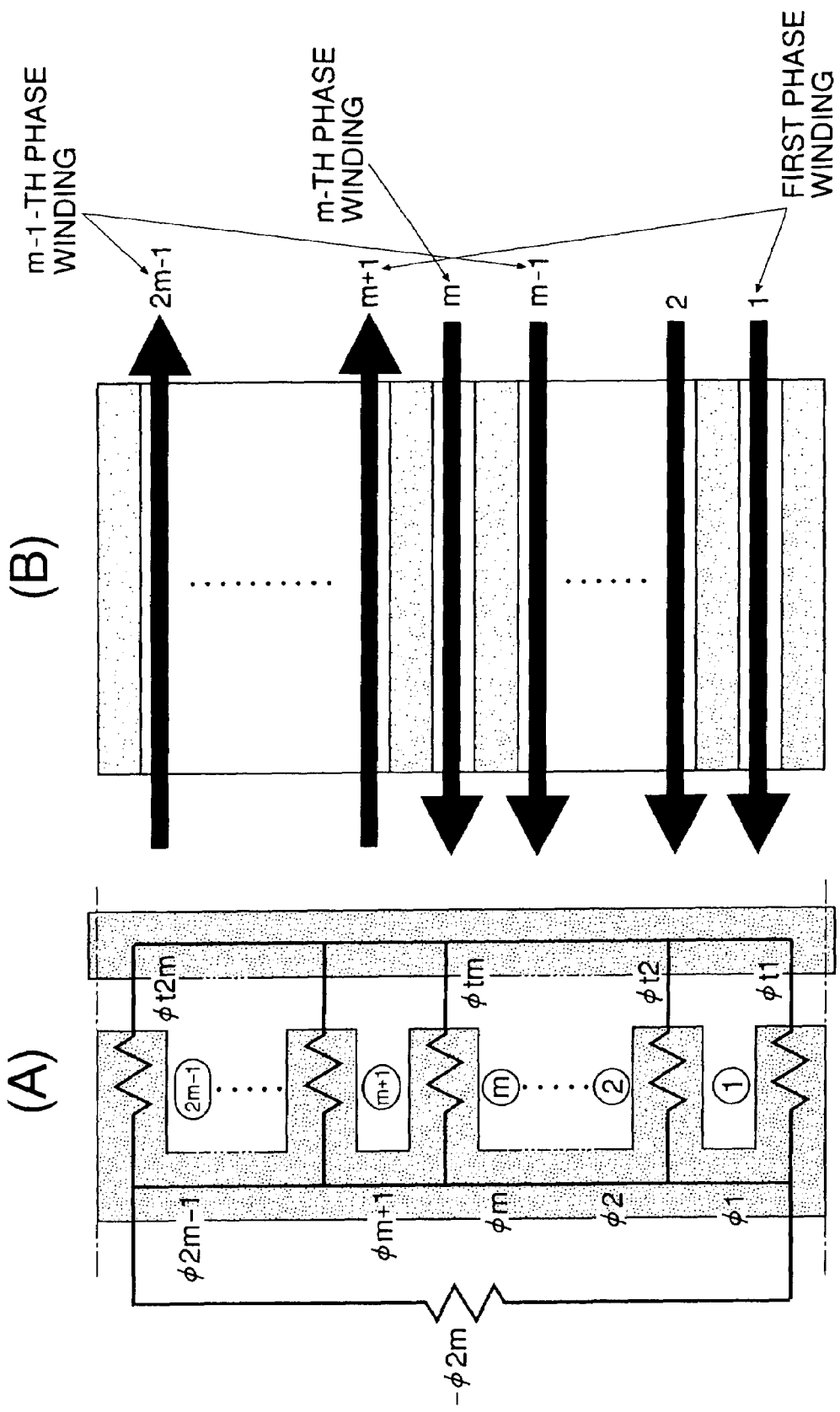
[FIG. 9A-9B]

FIG. 9 (A) and (B) show a magnetic circuit of an m-phase wave winding claw pole motor provided with 2m sets of teeth and 2m−1 of slots and resulting from the development of the above-described common m-phase wave winding motor in an axial direction. Even in this case, it can be seen that the flux linkage in each phase is not varied. More specifically, a flux linkage of a winding in a k-th phase ($1 \leq k \leq m-1$) is represented by $\phi k - \phi 2m - (\phi k + m - \phi 2m) = \phi k - \phi k + m$, which coincides with that in the magnetic circuit shown in FIG. 27A. A winding in a phase other than the m-th phase exists in correspondence to two slots, but the winding in the m-th phase exists only in correspondence to one slot.

If the above arrangement is described in summary, the 2m sets of teeth and the 2m−1 slots are disposed alternately in the axial direction. The windings each accommodated in the slots spaced apart from each other by m-number are connected in line, so that the exciting directions are opposite from each other, and a rotor flux passed through each of the teeth is displaced by 360°/2m. According to such arrangement, a magnetic circuit equivalent to the common m-phase wave winding claw pole motor shown in FIG. 27A can be formed. Even if the motor is formed in a structure (a distributed winding) in which K windings disposed continuously are connected in line in a case of N=2·K·m (K is a natural number of 2 or more), an equivalent magnetic circuit can be likewise formed.

Figure 1:
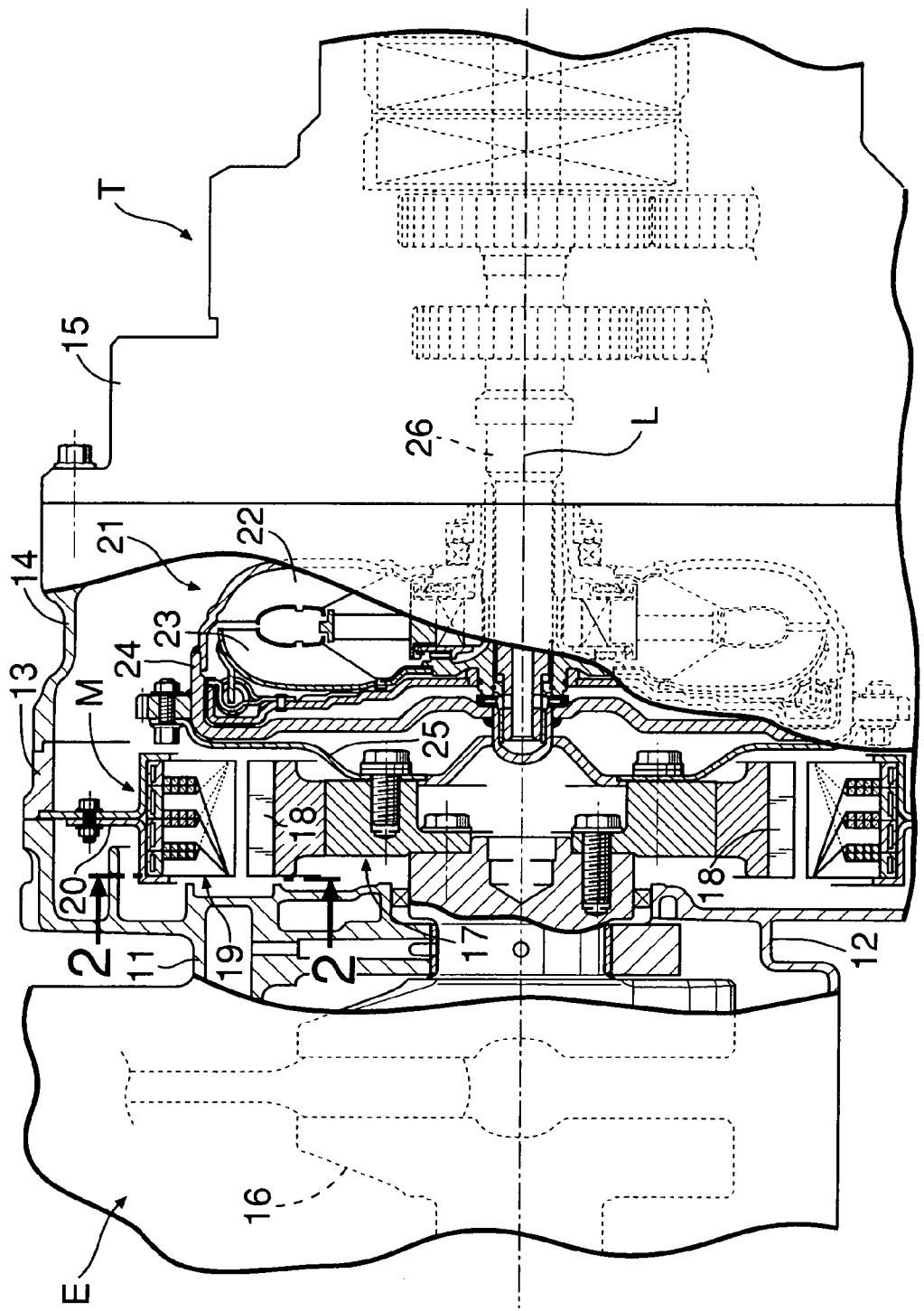
[FIG. 1]
Figure 2:
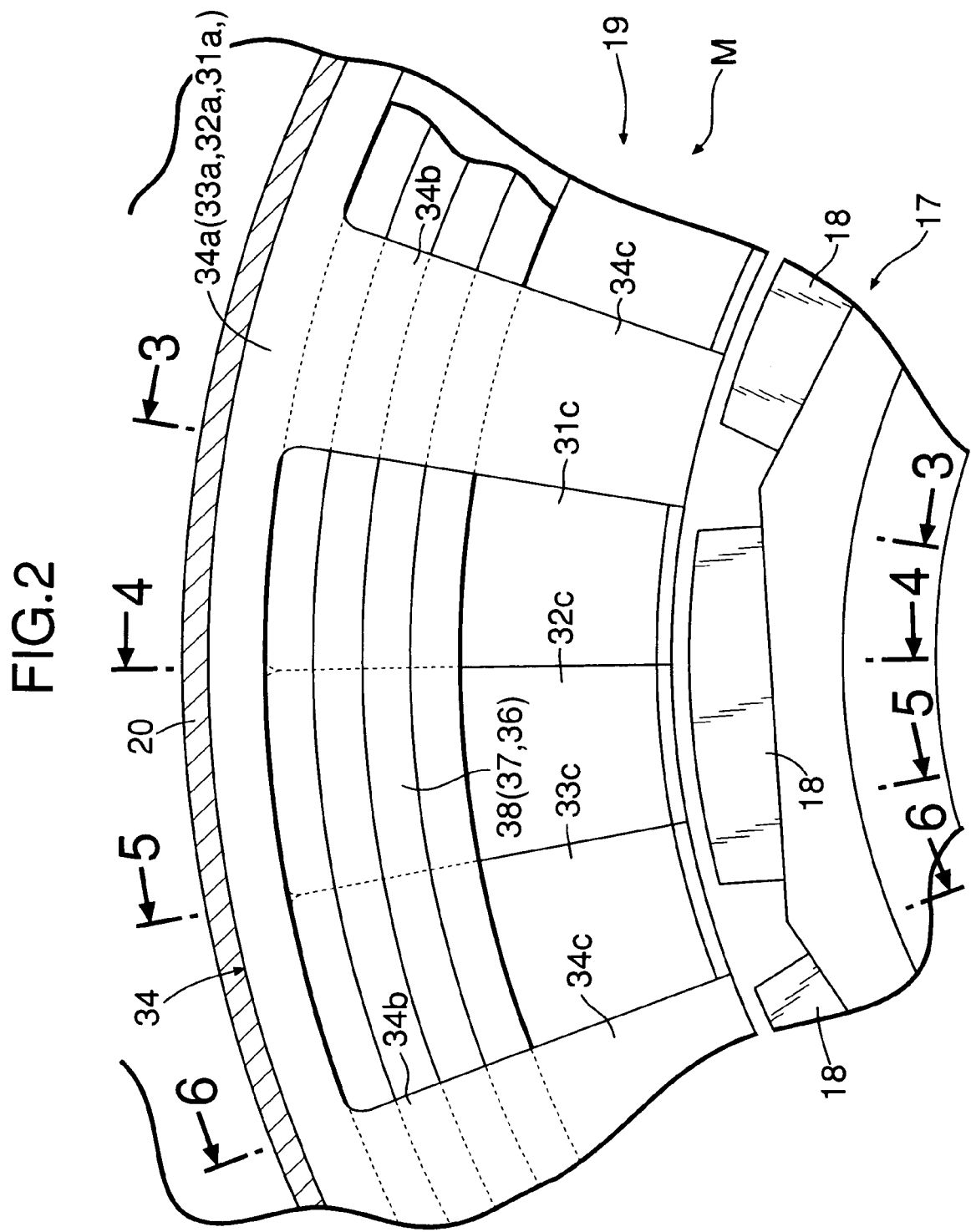
[FIG. 2]

As shown in FIG. 1, a power unit of a hybrid vehicle includes a 2-phase wave winding claw pole motor M disposed between an engine E and a transmission T. A motor case 13, a torque converter case 14 and a transmission case 15 are coupled to right sides of a cylinder block 11 and a crankcase 12 of the engine E, and a rotor 17 of the motor M is fixed to an end of a crankshaft 16 supported between the cylinder block 11 and the crankcase 12. An annular stator 19 is opposed to a plurality of permanent magnets 18 fixed to an outer periphery of the rotor 17, with a predetermined air gap provided therebetween, and a stator holder 20 supporting the stator 19 is clamped and fixed between parting faces of the cylinder block 11 as well as the crankcase 12 and the motor case 13.

A torque converter 21 housed in the torque converter case 14 includes a turbine runner 22 and a pump impeller 23, and a side cover 24 coupled to the turbine runner 22 to cover the pump impeller 23 is connected to the rotor 17 of the motor M through a drive plate 25. The pump impeller 23 of the torque converter 14 is coupled to a left end of a main shaft 26 supported in the transmission case 15.

The structure of the stator 19 of the two-phase wave winding claw pole motor M will be described with reference to FIGS. 2 to 8.

Figure 8:
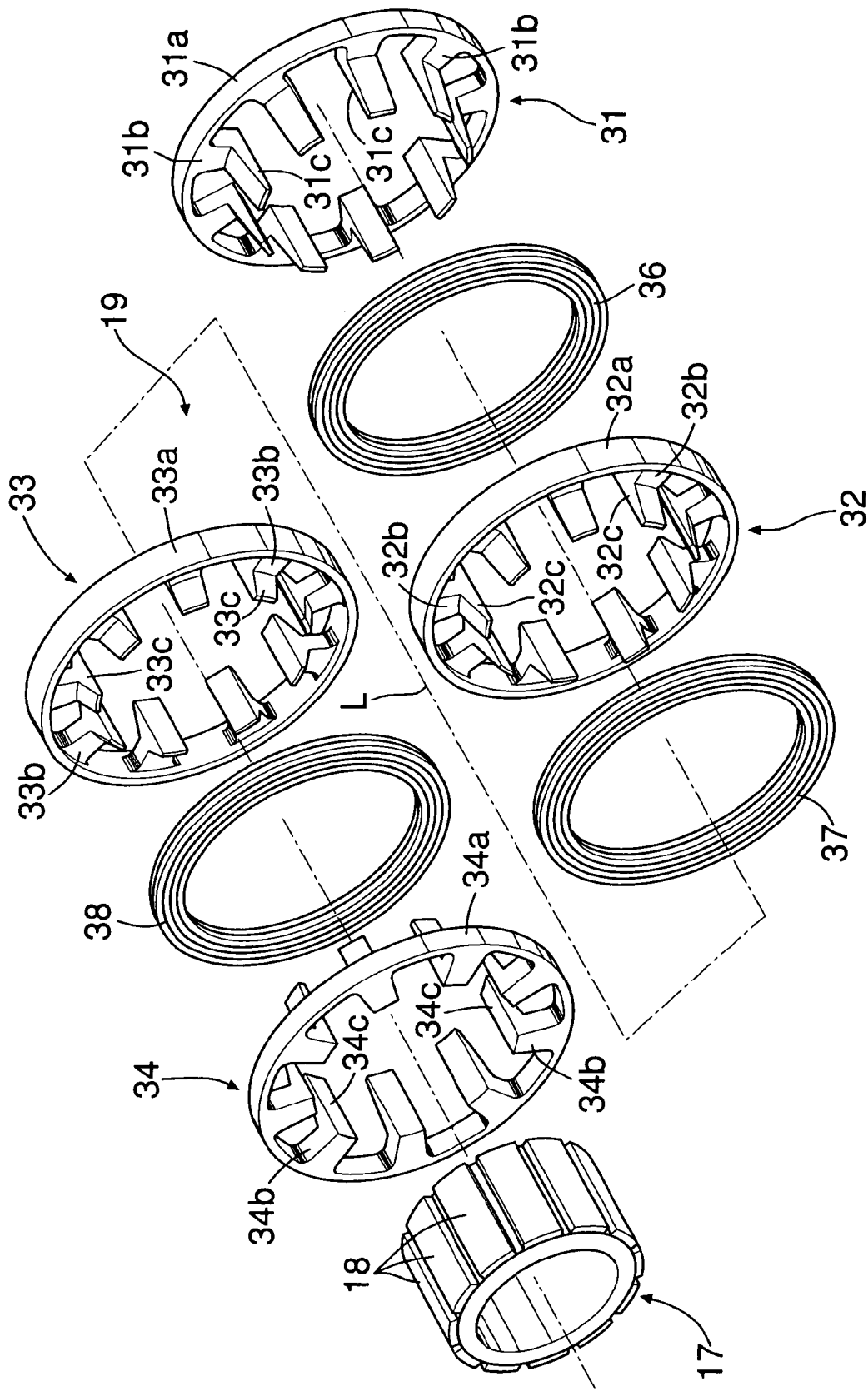
[FIG. 8]

As can be seen from FIG. 8, the stator 19 includes a first stator ring 31, a second stator ring 32, a third stator ring 33 and a fourth stator ring 34 which are formed by the monolithic molding from a green compact, an A$^+$ phase winding 36, a B$^+$ phase winding 37 and an A$^-$ phase winding 38. The first to fourth stator rings 31 to 34 are superposed one on another in a direction of an axial L.

Figure 3:
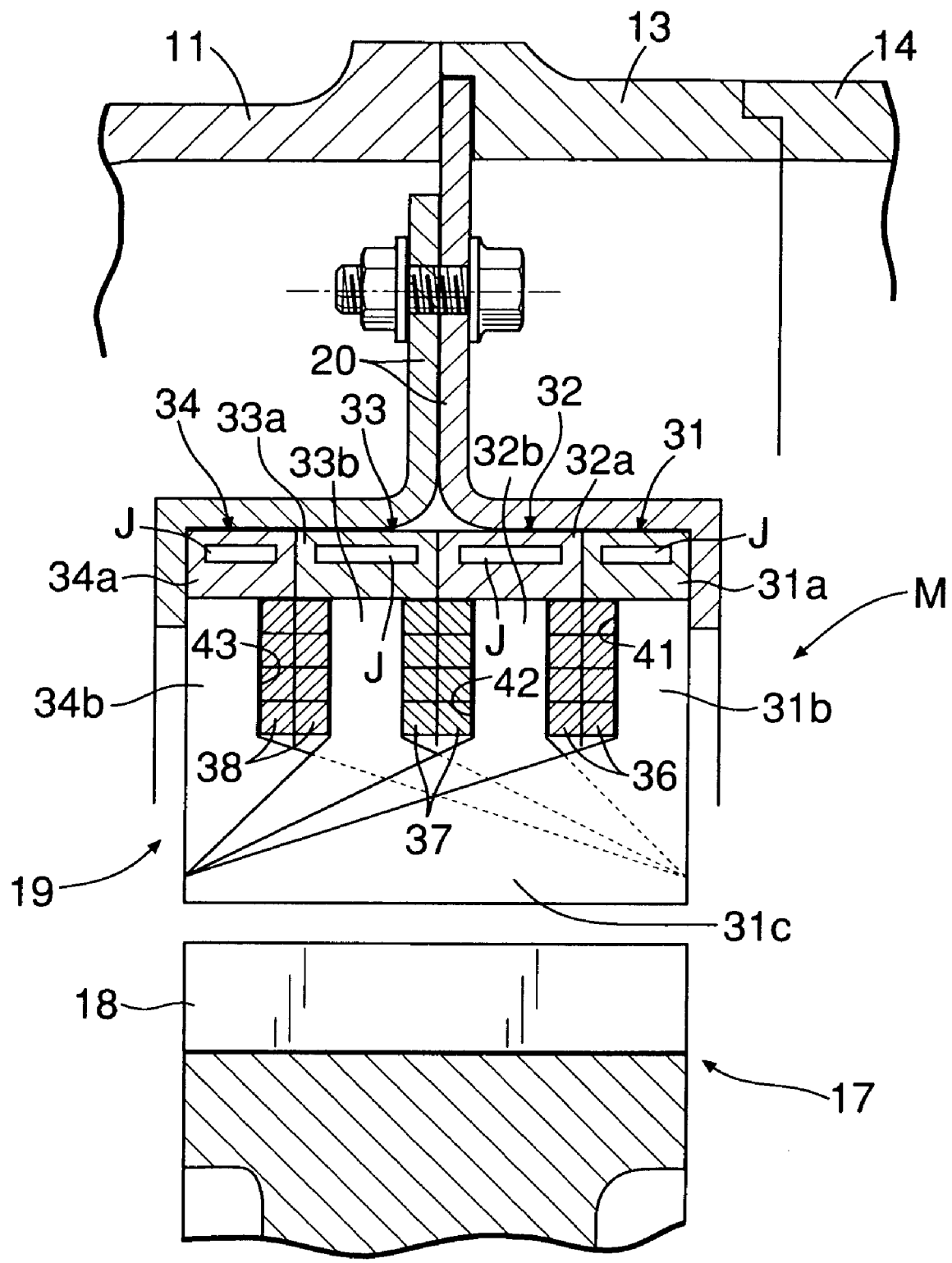
[FIG. 3]
Figure 7:
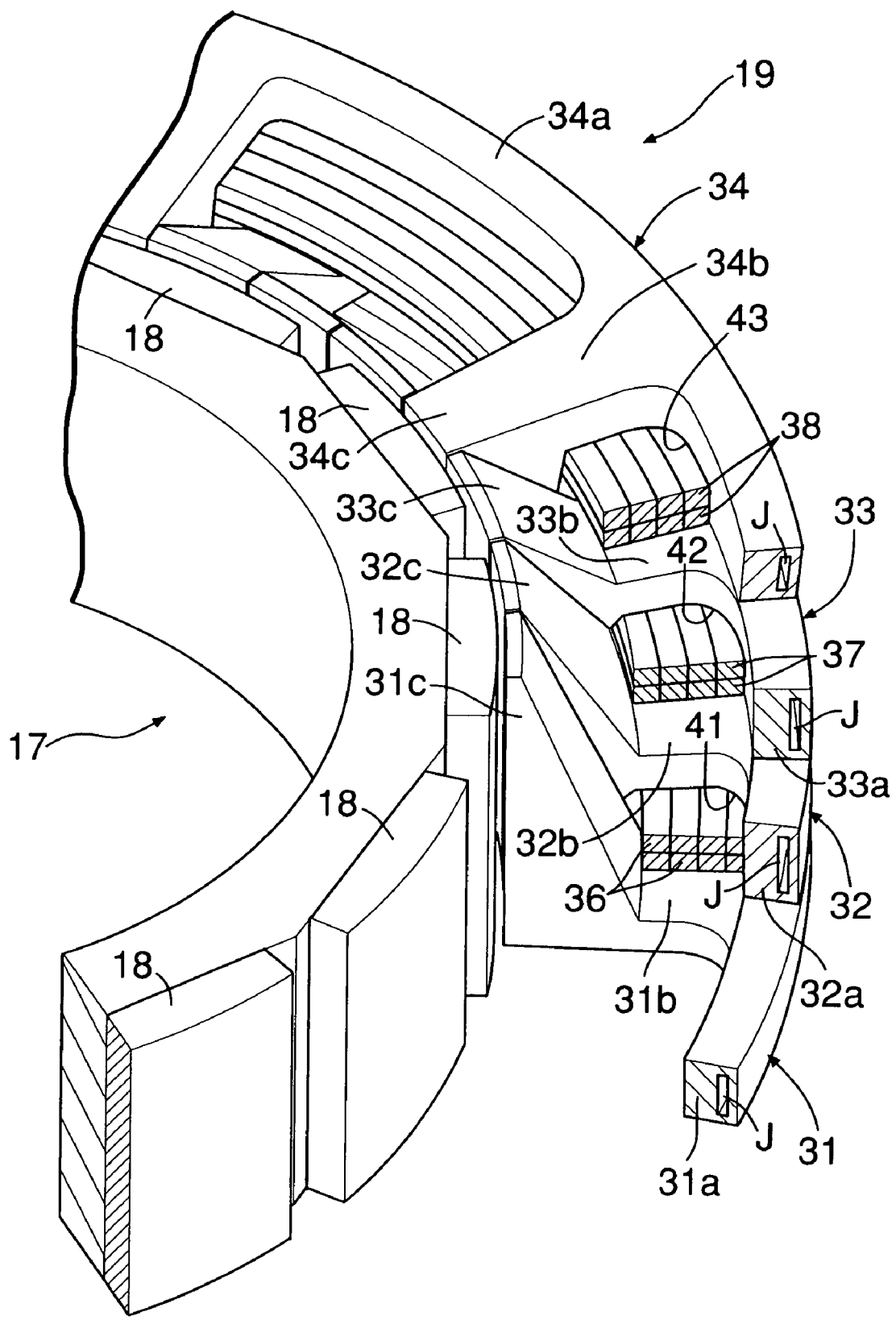
[FIG. 7]

As can be seen from FIGS. 3, 7 and 8, the first stator ring 31 includes a return pass 31a formed annularly, nine sets of teeth 31b extending diametrically inwards from points equally spaced from one another in a circumferential direction of the return pass 31a, and nine projections 31c extending further diametrically inwards from diametrically inner end of the teeth 31b. A diametrically inner end of each projection 31c extends in one of directions of the axis L, while being bent into an L-shape and tapered. The teeth 31b is a portion corresponding to the diametrical height of the winding 36, 37, 38, and a portion diametrically inner than such portion is the projection 31c.

Figure 4:
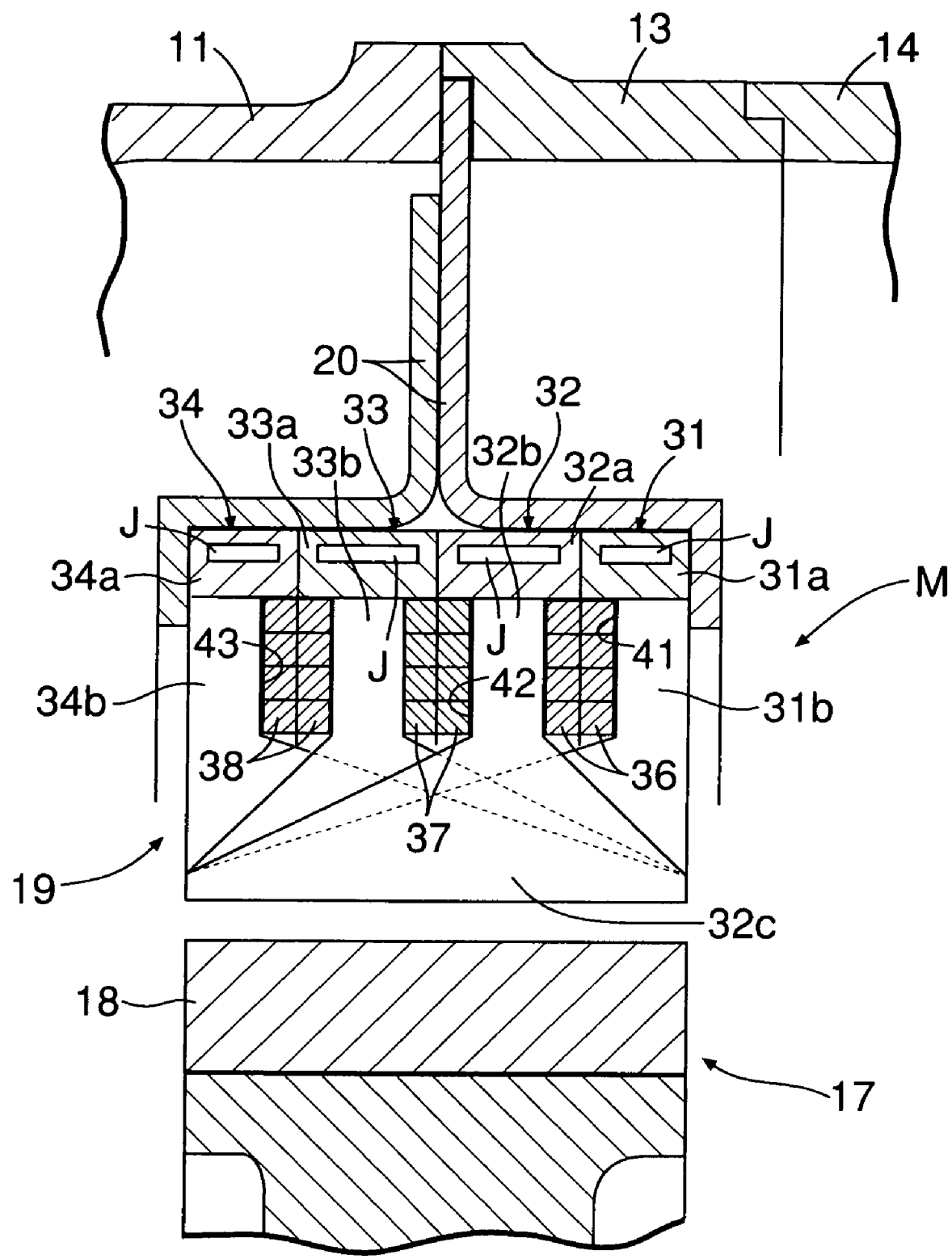
[FIG. 4]

As can be seen from FIGS. 4, 7 and 8, the second stator ring 32 includes a return pass 32a formed annularly, nine sets of teeth 32b extending diametrically inwards from points equally spaced from one another in a circumferential direction of the return pass 32a, and nine projections 32c extending further diametrically inwards from diametrically inner end of the teeth 32b. A diametrically inner end of each projection 32c extends in both of directions of the axis L, while being formed into a non-symmetric T-shape and tapered. Each of the teeth 32b is a portion corresponding to the diametrical height of the winding 36, 37, 38, and a portion diametrically inner than such portion is the projection 32c.

Figure 5:
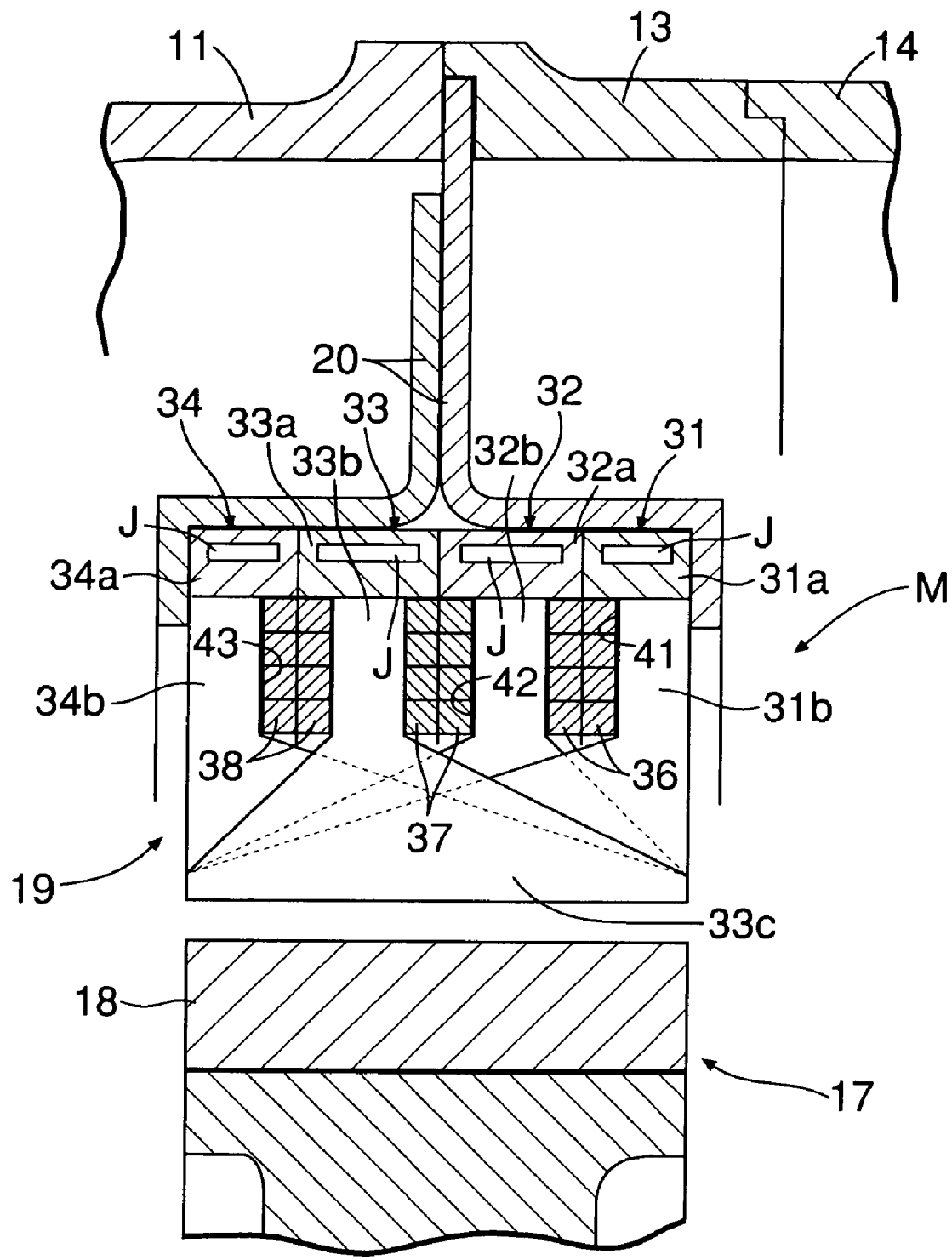
[FIG. 5]

As can be seen from FIGS. 5, 7 and 8, the third stator ring 33 is a member mirror-symmetric with the second stator ring 32, and has the same interchangeable shape as the second stator ring 32 by turning the ring 32 inside out. Reference numerals designating portions of the third stator ring 33 are those derived from changing of reference numerals "32" designating the portions of the second stator ring 32 to "33".

Figure 6:
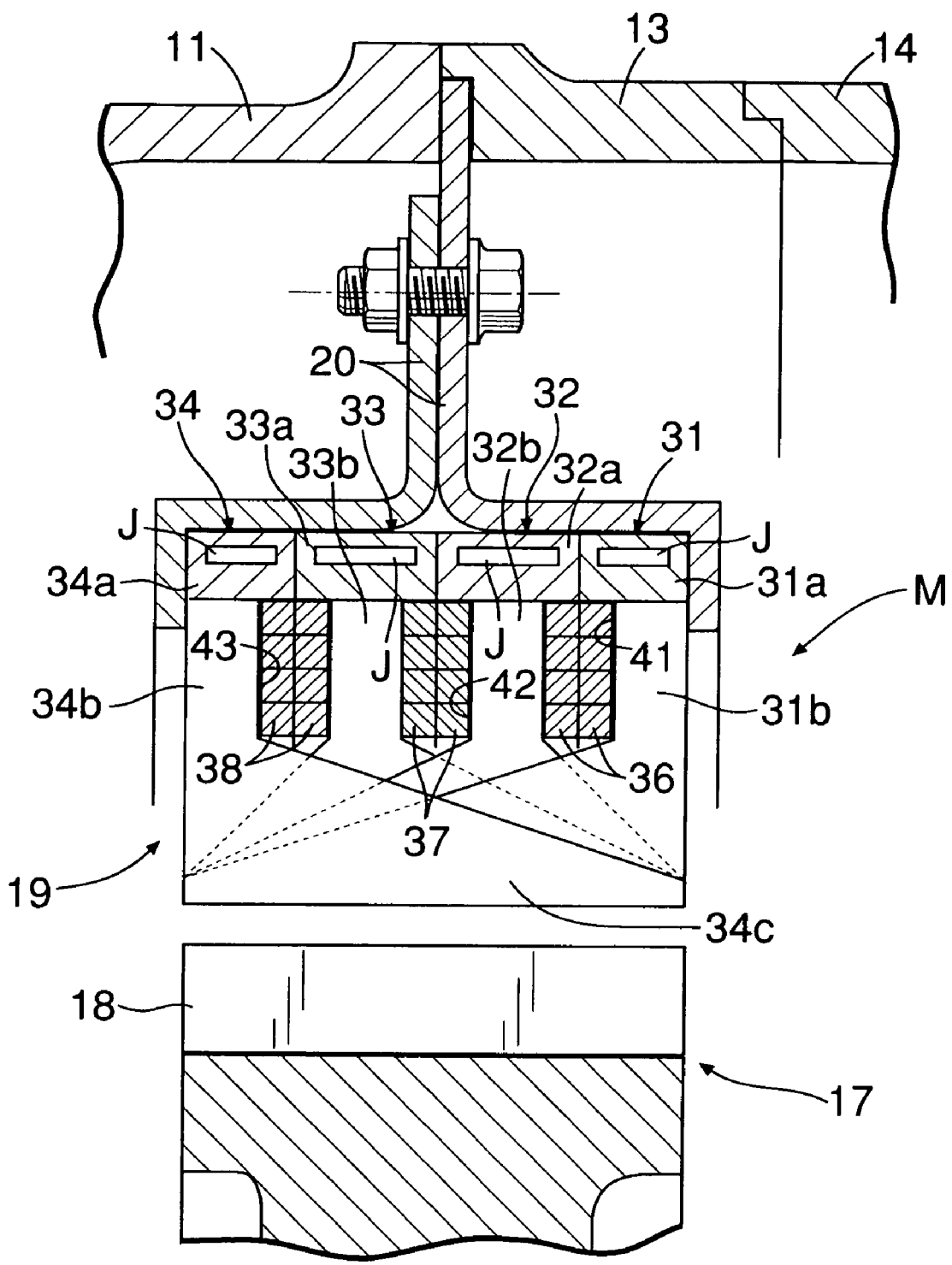
[FIG. 6]

As can be seen from FIGS. 6, 7 and 8, the fourth stator ring 34 is a member mirror-symmetric with the first stator ring 31 and has the same interchangeable shape as the first stator ring 31 by turning the ring 31 inside out. Reference numerals designating portions of the fourth stator ring 34 are those derived from changing of reference numerals "31" designating the portions of the first stator ring 31 to "34".

The motor M according to the present embodiment is operated in a two-phase alternating current, and the projections 31c, 32c, 33c and 34c in the A$^+$, B$^+$, A$^-$ and B$^-$ phases are arranged in such a manner that they are displaced circumferentially from one another by 360°/4=90° in terms of an electric angle. On the contrast, the permanent magnets 18 of the rotor 17 are shared to the projections 31c, 32c, 33c and 34c in the A$^+$, B$^+$, A$^-$ and B$^-$ phases and generate the same-phase magnetic flux. Thus, the projections 31c, 32c, 33c and 34c in each of the phases are capable of generating a uniform output torque in the rotor 17.

As can be seen from FIGS. 3 to 7, the faces of the nine projections 31c in the A$^+$ phase, the nine projections 32c in the B$^+$ phase, the nine projections 33c in the A$^-$ phase and the nine projections 34c in the B$^-$ phase, which are opposed to the rotor 17, assume substantially the same oblong shape and are arranged in sequence circumferentially along an inner peripheral surface of the stator 19. The widths of the projections 31c, 32c, 33c and 34c in the direction of the axis L are substantially equal to the widths of the permanent magnets 18 of the rotor 17 in the direction of the axis L and hence, it is possible to increase the flux linkage between the stator 19 and the rotor 17 to the maximum to increase the output torque from the rotor 17. Moreover, because the permanent magnets 18 are shared to the projections 31c, 32c, 33c and 34c in the A$^+$, B$^+$, A$^-$ and B$^-$ phases, it is possible to eliminate the need for the division of the permanent magnets 18 in the direction of the axis L in correspondence to the projections 31c, 32c, 33c and 34c in the phases and to decrease the number of the permanent magnets 18.

An annular slot 41 is defined between the teeth 31b of the first stator ring 31 and the teeth 32b of the second stator ring 32, and a previously wound A$^+$-phase winding 36 is accommodated in the slot 41. An annular slot 42 is defined between the teeth 32b of the second stator ring 32 and the teeth 33b of the third stator ring 33, and a previously wound B$^+$-phase winding 37 is accommodated in the slot 42. An annular slot 43 is defined between the teeth 33b of the third stator ring 33 and the teeth 34b of the fourth stator ring 34, and a previously wound A$^-$-phase winding 38 is accommodated in the slot 43.

In this way, the three windings 36, 37 and 38 are fixed in a clamped manner in the three slots 41, 42 and 43 defined between adjacent ones of the first to fourth stator rings 31 to 34 and hence, special fixing members for fixing the windings 36, 37 and 38 are not required. Moreover, the windings 36, 37 and 38 are accommodated in the slots 41, 42 and 43 with no risk of the interference with external parts and hence, it is easy to manage the sizes of the external parts.

Each of the windings 36, 37 and 38 is formed from a straight angle wire having an oblong section as a conductor, which is wound in four layers in a diametrical direction and in two layers in the direction of the axis L. The directions of exciting forces of the A+-phase winding 36 and the B+-phase winding 37 are established to be the same, and the direction of an exciting force of the A−-phase winding 38 is established to be opposite from the above-described directions.

Thus, by supplying 2-phase alternating current to the A+ and A−-phase windings 36 and 38 and the B+-phase winding 37, rotating magnetic field can be formed on the A+-phase projections 31c, the B+-phase projections 32c, the A−-phase projections 33c and the B−-phase projections 34c arranged in sequence on the inner peripheral surface of the stator 19, and the rotor 17 can be rotated by magnetic forces generated between the permanent magnets 18 and the magnetic field.

By disusing a portion of each of the A+, B+ and A−-phase windings 36, 37 and 38, which is disposed to surround the axis L cylindrically and does not contribute to the output torque (i.e., a crossover portion) and by sharing a magnetic path in each phase, as mall-sized and high-powered motor M can be produced by effectively utilizing the first to fourth stator rings 31 to 34. The motor M can be easily disposed in a narrow space between the engine E and the transmission T, especially by reducing the thickness of the motor M.

A cooling structure in the stator 19 of the motor M will be described below.

Each of the first to fourth stator rings 31 to 34 in the present embodiment is formed of a magnetic green compact material. More specifically, each of the first to fourth stator rings 31 to 34 is produced by pressing, in a die system into a predetermined shape, a green compact material made from a powder of a magnetic material such as an iron-based alloy made by Heganes, Co., whose surface is coated with a skin of a inorganic material, subjecting the resulting material to a sizing for adjustment of the shape and then to a heat curing treatment. In this way, each of the first to fourth stator rings 31 to 34 having a complicated shape can be easily produced by using the magnetic green compact material.

Annular refrigerant passages J are formed around outer peripheries of the first to fourth stator rings 31 to 34 of the stator 19 using a core in the molding of the green compact, and a rise in temperature of the A+-phase winding 36, the B+-phase winding 37 and the A−-phase winding 38 due to the generation of heat therein can be suppressed by permitting the flowing of cooling water or cooling air as a refrigerant through the refrigerant passages J. Because the refrigerant passages J are provided within the first to fourth stator rings 31 to 34 of the stator 19, the contour of the stator 19 cannot be influenced, and the holding of the stator 19 by the stator holder 20 cannot be hindered. In addition, because the refrigerant passages J are provided directly within the stator 19, an effect of cooling by the refrigerant can be ensured sufficiently, and the leakage of the refrigerant can be prevented and moreover, the degree of freedom for a method for holding the stator 19 can be increased.

Figure 10:
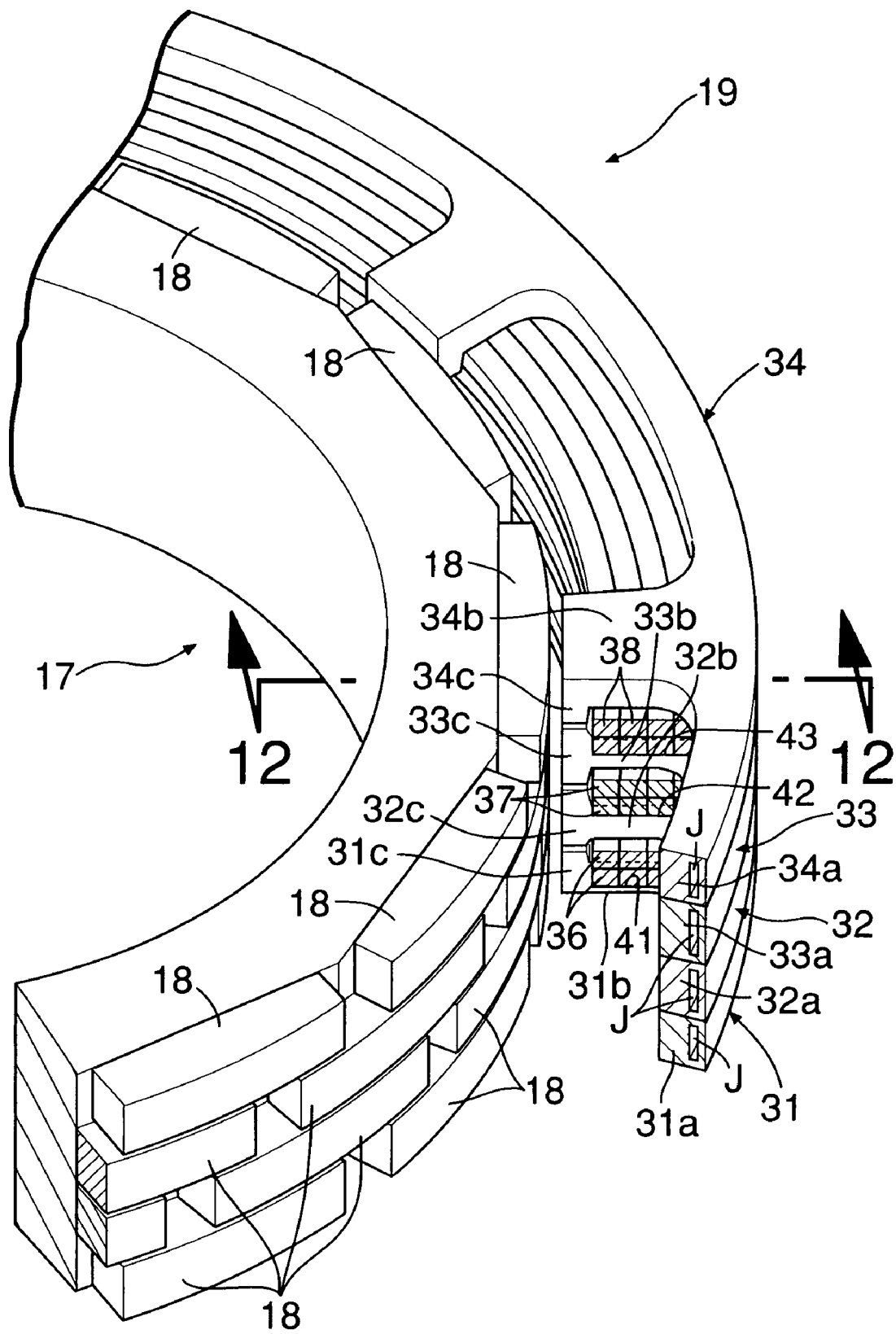
[FIG. 10]
Figure 11:
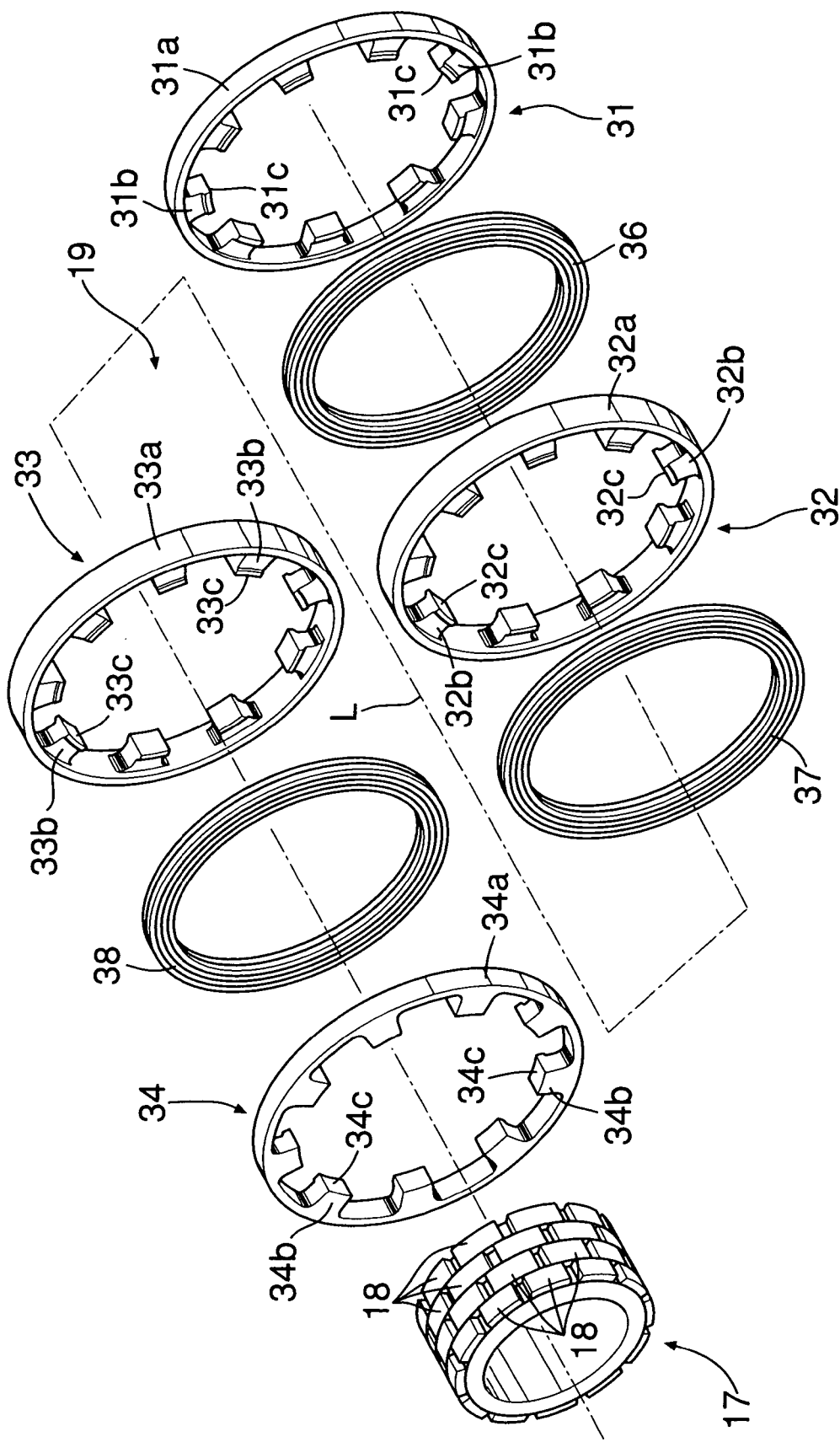
[FIG. 11]
Figure 12:
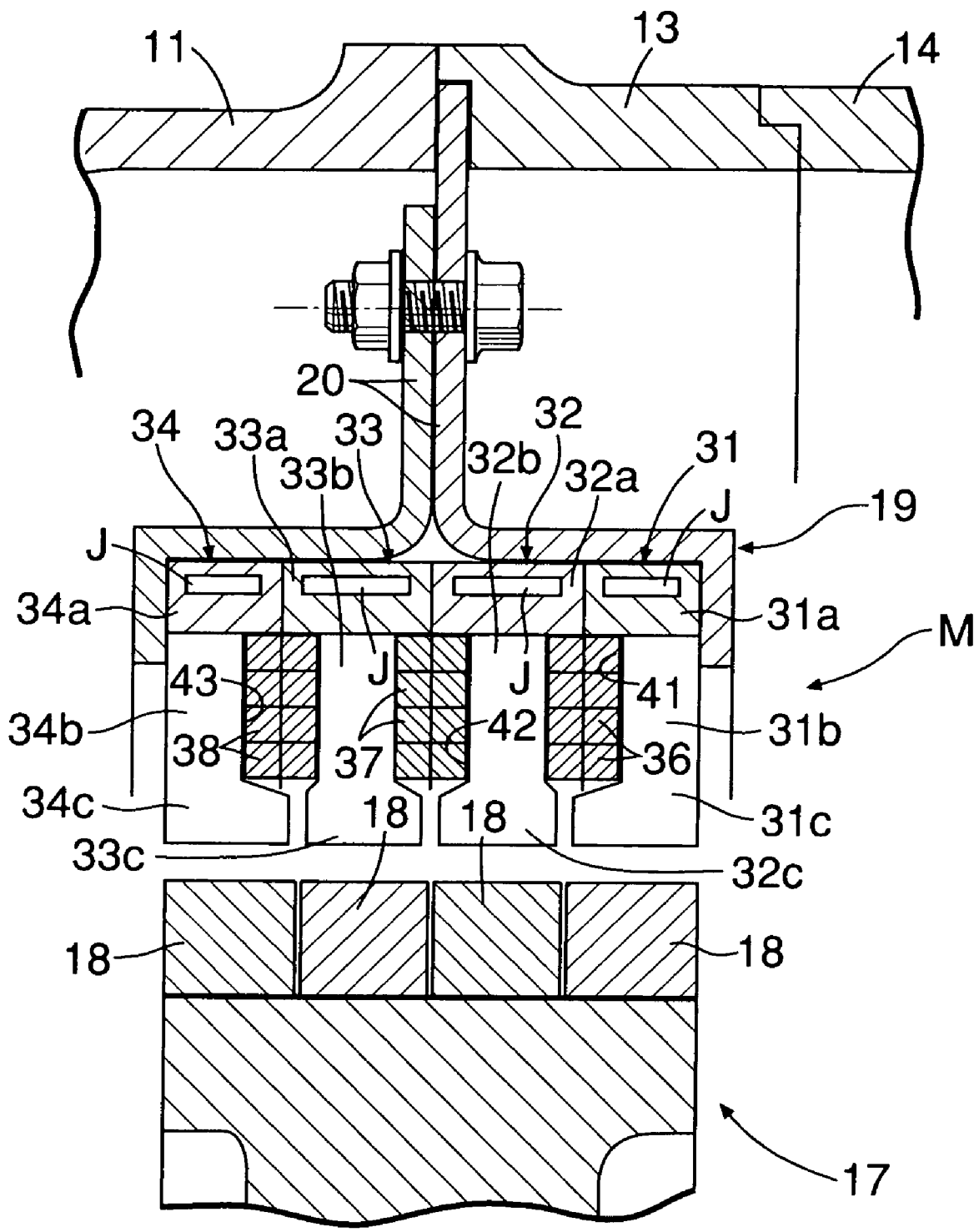
[FIG. 12]
Figure 14:
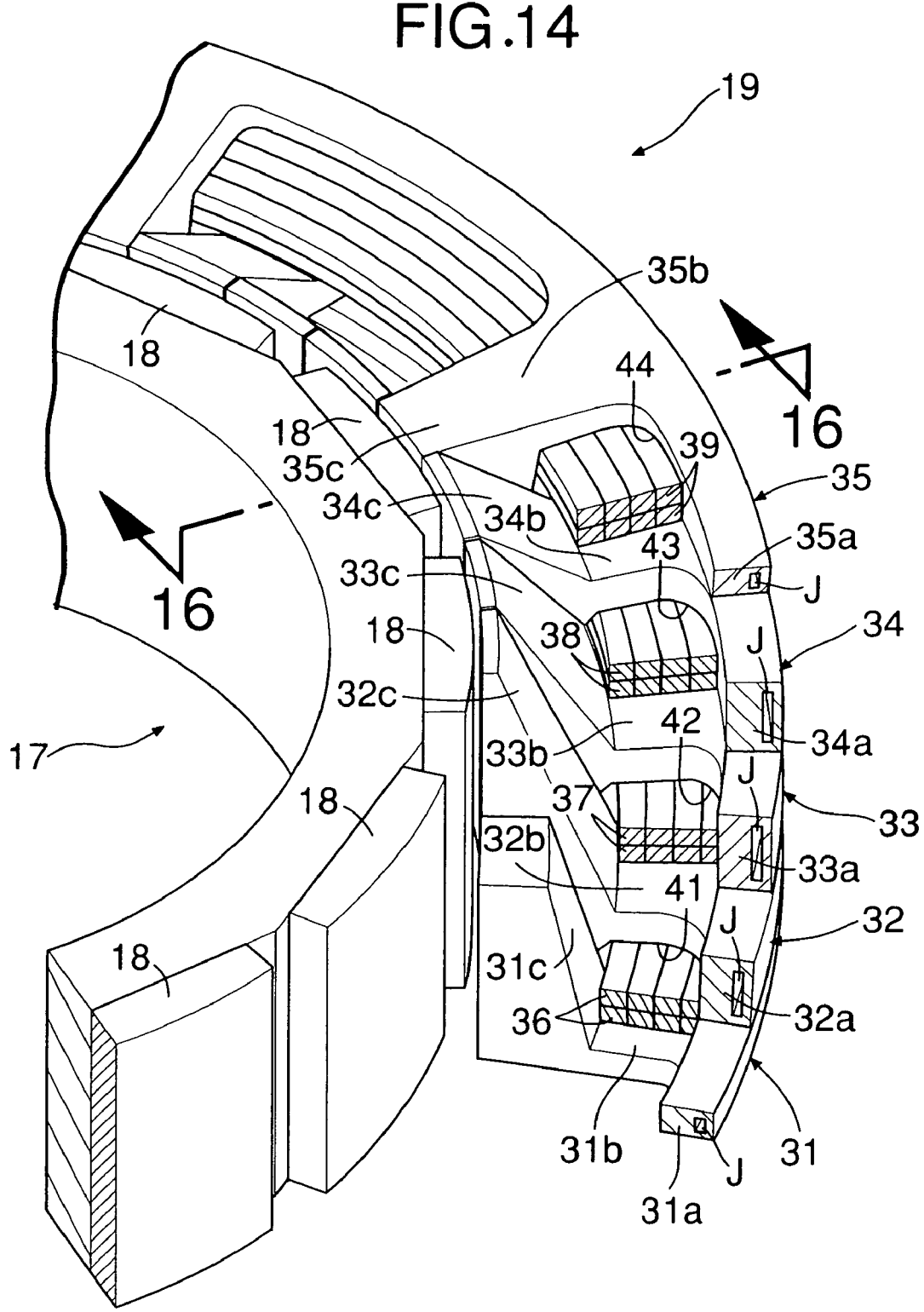
[FIG. 14]
Figure 15:
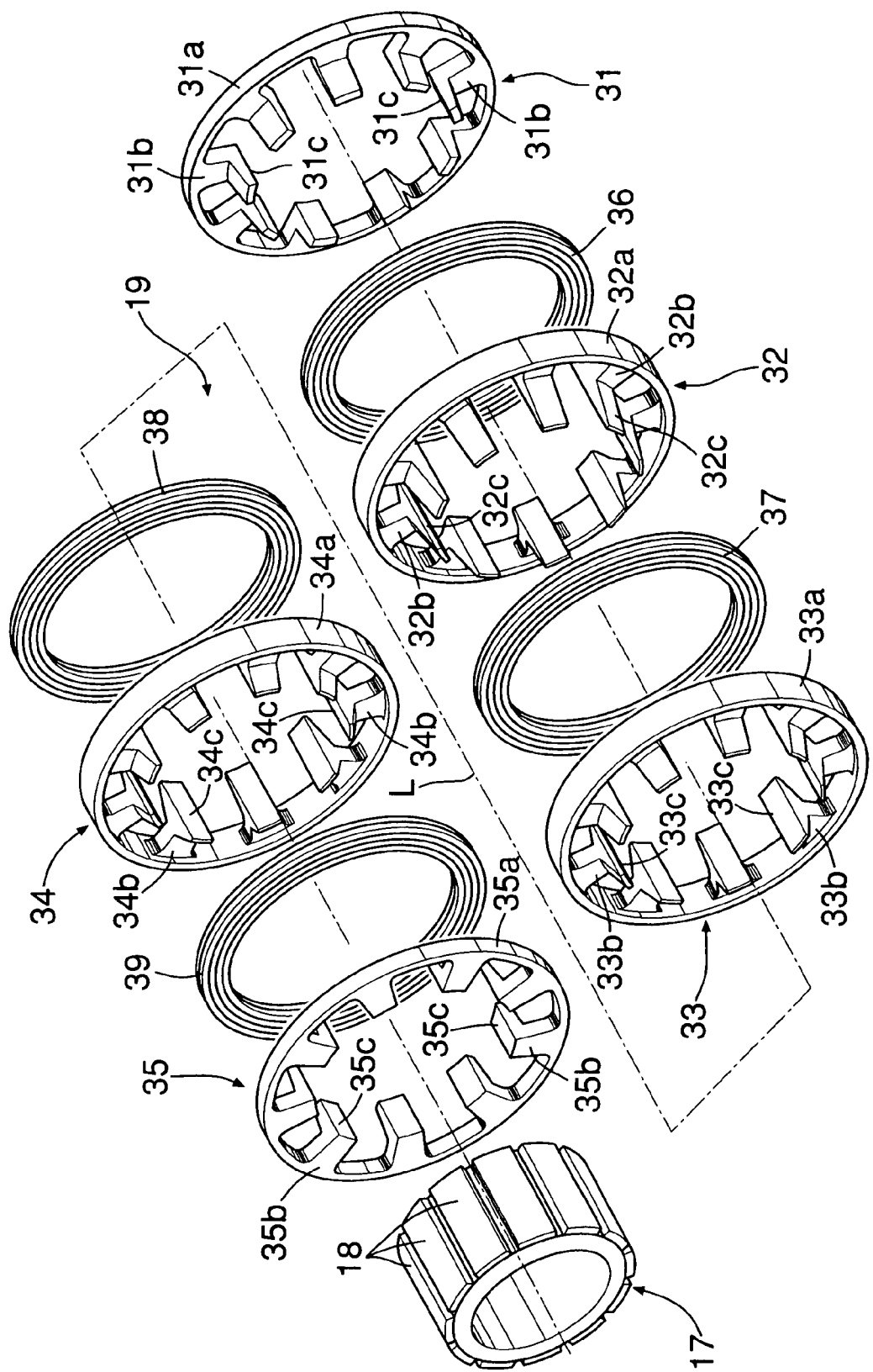
[FIG. 15]
Figure 16:
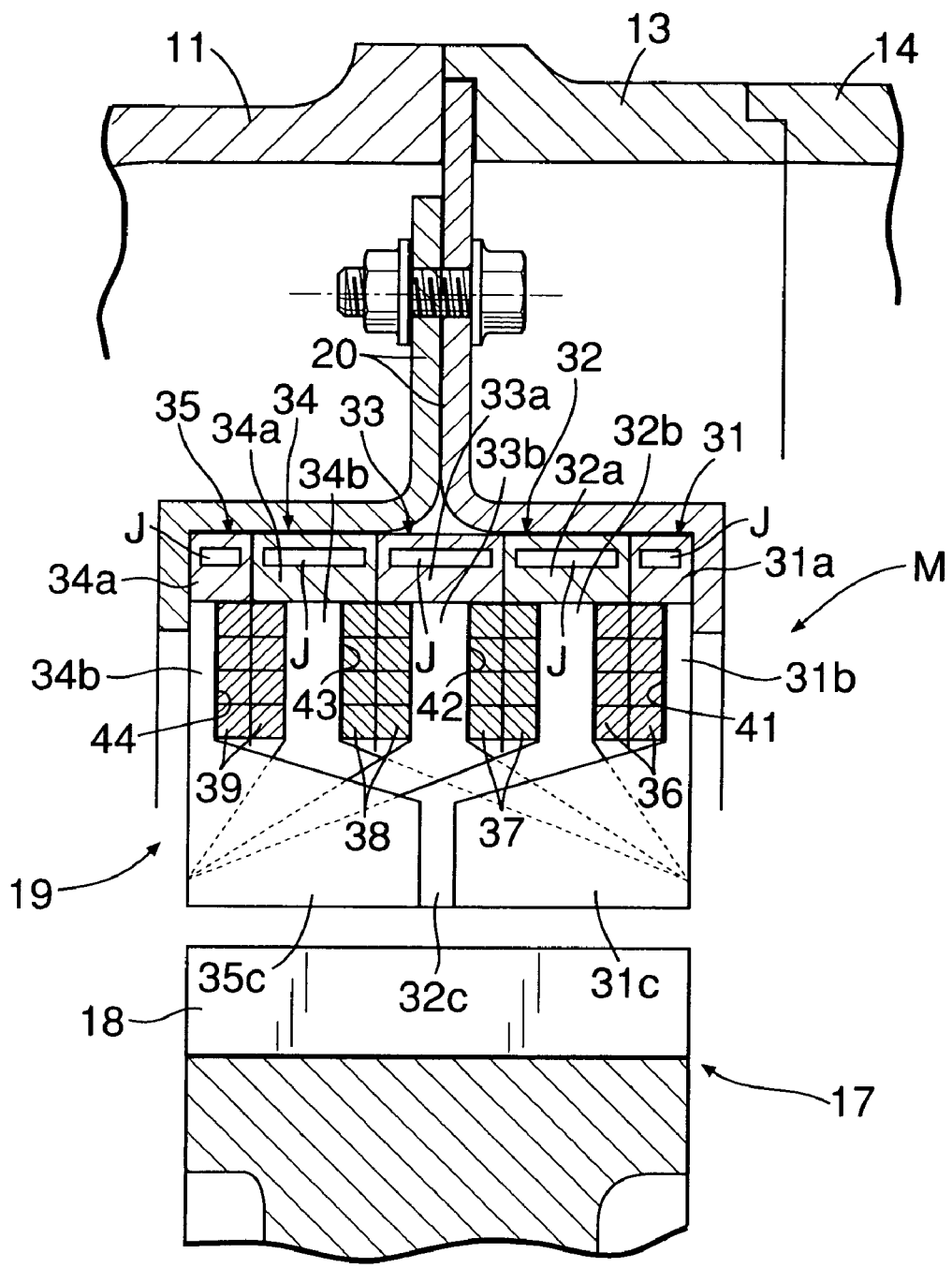
[FIG. 16]

A second embodiment of the present invention will now be described with reference to FIGS. 10 to 12.

Embodiment 2

The teeth 31b, 32b, 33b and 34b in the A+, B+, A− and B−-phases of the stator 19 in the first embodiment are arranged with their phases displaced circumferentially from one another, and the projections 31c, 32c, 33c and 34c extending in the direction of the axis L from the diametrically inner ends of the teeth 31b, 32b, 33b and 34b have the same widths as the thickness of the stator 19 in the direction of the axis L. The permanent magnets 18 of the rotor 17 have the same widths as those of the projections 31c, 32c, 33c and 34c, and are shared to the projections 31c, 32c, 33c and 34c in each phase.

On the contrast, teeth 31b, 32b, 33b and 34b in A+, B+, A− and B−-phases of a stator 19 in the second embodiment are arranged in the same phase, and projections 31c, 32c, 33c and 34c extending at substantially the same thickness diametrically inwards from the teeth 31b, 32b, 33b and 34b are also arranged in the same phase. On the other hand, permanent magnets 18 arranged around an outer periphery of a rotor 17 are arranged at four stages in a direction of an axis L in correspondence to the projections 31c 32c, 33c and 34c in the phases and with their phases displaced circumferentially from one another by 360°/2m=90° in terms of an electric angle. The structures of windings 36, 37 and 38 in the A+, B+ and A−-phases are the same as those in the first embodiment.

Even according to the second embodiment, the thickness of the stator 19 in the direction of the axis L can be reduced, as in the above-described first embodiment, but the number of parts is increased in correspondence to the division of the permanent magnets 18 into the four stages, and the output torque from the rotor 17 is reduced in correspondence to a reduction in areas of the projections 31c, 32c, 33c and 34c in the various phases opposed to the permanent magnets 18. However, the phases of the projections 31c, 32c, 33c and 34c of the stator 19 can be uniformized and hence, the structure of the stator 19 can be simplified.

A third embodiment of the present invention will now be described with reference to FIGS. 13A and 13B.

Embodiment 3

The third embodiment is a modification to the second embodiment. In the second embodiment, the phases of the projections 31c, 32c, 33c and 34c in each phase are uniformized, and the phases of the permanent magnets 18 in each phase are displaced from one another by 360°/2m=90°. On the contrast, in the third embodiment, the phases of projections 31c, 32c, 33c and 34c in each phase are displaced from one another by 360°/2m=90°, and the phases of permanent magnets 18 in each phase are uniformized. Even according to the third embodiment, a functional effect similar to that in the second embodiment can be achieved. If the permanent magnets 18 are not divided into four stages and the same permanent magnets 18 as those of the rotor 18 in the first embodiment are employed, the number of parts can be reduced.

Now, if the magnetic circuit of the conventional common M-phase wave winding motor shown in FIG. 27A is divided circumferentially, as shown in FIG. 27B, a magnetic flux φ0 is generated in each of division faces. If the divided magnetic circuit shown in FIG. 27B is developed axially, as shown in FIG. 17(A) and (B), a magnetic circuit of an m-phase wave winding claw pole motor having 2m+1 sets of teeth and 2m slots is formed, and a magnetic flux φ0 is passed through a back yoke portion. At this time, a flux linkage of a k-th phase winding ($1 \leq k \leq m$) is represented by φk−φ0−(φk+m−φ0) =φk−φk+m and coincides with that shown in FIG. 27A.

If the above-described arrangement is summarized, the 2m+1 sets of teeth and the 2m slots are arranged alternately in an axial direction; windings each accommodated in the slots spaced apart from each other by m are connected in line, so that exciting directions are opposite; rotor magnetic fluxes passed through the teeth are displaced by 360°/2m; and further, magnetic fluxes passed through first and 2m+1-th teeth are ½ of magnetic fluxes passed through the other teeth in the same phase. Thus, a magnetic circuit equivalent to that of the common m-phase wave winding motor shown in FIG. 27A can be formed. When N=2·K·m (K is a natural number of 2 or more), even if a structure is such that K windings arranged continuously are connected in line (distributed winding), an equivalent magnetic circuit can be likewise formed.

A fourth embodiment, in which the above-described m-phase wave winding claw pole motor is embodied, will be described with reference to FIGS. 14 to 17.

Example 4

Each of the first to third embodiments has the three slots 41, 42 and 43 between the adjacent ones of the first to fourth stator rings 31 to 34 laminated one on another in the direction of the axis L, but the fourth embodiment has four slots 41, 42, 43 and 44 between adjacent ones of first to fifth stator rings 31 to 35 laminated one on another in a direction of an axis L. In the centrally located third stator ring 33, each of projections 33c connected to a diametrically inner side of an annular return pass 33a through teeth 33b has a shape symmetric in the direction of the axis L, and the second stator ring 32 and the fourth stator ring 34 located on opposite sides of the third stator ring 33 are interchangeable mirror-symmetric members and have projections 32c and 34c which are each asymmetric in the direction of the axis L.

The first stator ring 31 and the fifth stator ring 35 located on opposite sides of the second stator ring 32 and the fourth stator ring 34 are inter changeable mirror-symmetric members and have projections 31c and 35c which are each asymmetric in the direction of the axis L. The projections 31c and 35c are at the same circumferential location as the stator 19 and extend in directions toward each other. Therefore, the widths of the projections 31c and 35c of the first stator ring 31 and the fifth stator ring 35 in the direction of the axis L are about half of those of the projections 32c to 34c of the second to fourth stator rings 32 to 34 in the direction of the axis L.

Four slots 41, 42, 43 and 45 are defined between adjacent ones of the first to fifth stator rings 31 to 35, and an A$^+$-phase winding 36, a B$^+$-phase winding 37, an A$^-$-phase winding 38 and B$^-$-phase winding 39 are accommodated in the slots 41, 42, 43 and 44, respectively. The directions of exciting forces of the A$^+$-phase winding 36 and the B$^+$-phase winding 37 are the same as each other, and the directions of exciting forces of the A$^-$-phase winding 38 and the B$^-$-phase winding 39 are the same as each other and are set so as to be opposite from the directions of exciting forces of the A$^+$-phase winding 36 and the B$^+$-phase winding 37.

Thus, by supplying 2-phase alternating current to the A$^+$ and A$^-$-phase windings 36 and 38 and the B$^+$ and B$^-$-phase windings 37 and 39, rotating magnetic fields can be formed on the A$^+$-phase projections 31c and 35c, the B+-phase projections 32c, the A$^-$-phase projections 33c and the B$^-$-phase projections 34c arranged in sequence around an inner peripheral surface of a stator 19, and the rotor 17 can be rotated by electromagnetic forces generated between permanent magnets 18 and the magnetic fields.

At this time, magnetic fluxes passed through teeth 31b and 35b of the first stator ring 31 and the fifth stator ring 35 located at opposite ends in the direction of the axis L are half of magnetic fluxes passed through teeth 32b, 33b and 34b of the other stator rings, i.e., the second stator ring 32, the third stator ring 33 and the fourth stator ring 34. However, the teeth 31b and 35b of the first stator ring 31 and the fifth stator ring 35 are arranged at the same phase and function substantially in unison with each other and hence, an unbalance of the magnetic fluxes between the adjacent phases cannot be generated.

Thus, even according to the fourth embodiment, by disusing a portion of each winding which does not contribute to the output torque (i.e., a crossover portion) and sharing a magnetic path in each phase, a small-sized and high-powered motor M can be produced by effectively utilizing the first to fifth stator rings 31 to 35, because the A$^+$-phase winding 36, the B$^+$-phase winding 37, the A$^-$-phase winding 38 and the B$^-$-phase winding 39 are arranged to surround the axis L cylindrically. The motor M can be easily disposed in a narrow space between the engine E and the transmission T, especially by reducing the thickness of the motor M.

A fifth embodiment of the present invention will now be described with reference to FIGS. 18 to 20.

Embodiment 5

The A$^+$-phase, B$^+$-phase, A$^-$-phase and B$^-$-phase teeth 31b (35b), 32b, 33b and 34b of the stator 19 in the fourth embodiment are arranged with their phases displaced circumferentially from one another, and the projections 31c (35c), 32c, 33c and 34c extending in the direction of the axis L from the diametrically inner ends of the teeth 31b (35b), 32b, 33b and 34b have the same width as the thickness of the stator 19 in the direction of the axis L. The permanent magnets 18 of the rotor 17 have the same widths as those of the projections 31c (35c), 32c, 33c and 34c and are shared to the projections 31c (35c), 32c, 33c and 34c in each phase.

On the contrast, A$^+$-phase, B$^+$-phase, A$^-$-phase and B$^-$-phase teeth 31b (35b), 32b, 33b and 34b of a stator 19 in the fifth embodiment are arranged at the same phase, and projections 31c (35c), 32c, 33c and 34c extending diametrically inwards from the teeth 31b (35b), 32b, 33b and 34b are also arranged at the same phase. On the other hand, permanent magnets 18 arranged around an outer periphery of a rotor 17 are arranged at five stages in a direction of an axis L in correspondence to the projections 31c (35c), 32c, 33c and 34c in the phases and with their phases displaced circumferentially from one another by 360°/2m=90° in terms of an electric angle. However, the permanent magnets 18 in correspondence to the projections 31c and 35c at the opposite ends in the direction of the axis L are arranged at the same phase. The structures of windings 36, 37, 38 and 39 in the A$^+$, B$^+$, A$^-$ and B$^-$-phases are the same as those in the fourth embodiment.

Even according to the fifth embodiment, the thickness of the stator 19 in the direction of the axis L can be reduced, as in the above-described fourth embodiment, but the number of parts is increased in correspondence to the division of the permanent magnets 18 into the five stages, and the output torque from the rotor 17 is reduced in correspondence to a reduction in areas of the projections 31c (35c), 32c, 33c and 34c in the various phases opposed to the permanent magnets 18. However, the phases of the projections 31c (35c), 32c, 33c and 34c of the stator 19 can be uniformized and hence, the structure of the stator 19 can be simplified.

A sixth embodiment of the present invention will now be described with reference to FIGS. 21A and 21B.

Embodiment 6

The sixth embodiment is a modification to the fifth embodiment. In the fifth embodiment, the phases of the projections 31c (35c), 32c, 33c and 34c in each phase are uniformized, and the phases of the permanent magnets 18 in each phase are displaced from one another by 360°/2m=90°. On the contrast, in the sixth embodiment, the phases of projections 31c (35c), 32c, 33c and 34c in each phase are displaced from one another by 360°/2m=90°, and the phases of permanent magnets 18 in each phase are uniformized. Even according to the sixth embodiment, a functional effect similar to that in the fifth embodiment can be achieved. If the permanent magnets 18 are not divided into five stages and the same permanent magnets 18 as those of the rotor 19 in the fourth embodiment are employed, the number of parts can be reduced.

In the claw pole motor M according to each of the embodiments described above, the torque can be increased as compared with that in a salient pole concentrated winding (a short-pitch concentrated winding), by the employment of a wave winding (a full-pitch concentrated winding) for the windings 36, 37, 38 and 39. The reason will be described below.

In a distribution of a winding in a salient pole concentrated winding shown in FIG. 22, the magnitudes of magnetomotive forces of the winding in directions displaced at 120°, as shown in FIG. 23A, are represented by two vectors of 1. The exciting directions in a and b are opposite from each other and hence, vectors of a change in magnetic flux linked to b, as shown in FIG. 23B, are in directions opposite from each other, and the magnitude of an electromotive force which is a resultant vector is $\sqrt{3}$.

On the contrast, in a distribution of the winding in the wave winding in the present embodiment shown in FIG. 24, the magnitudes of magnetomotive forces of the winding in directions displaced at 180°, as shown in FIG. 25A, are represented by two vectors of 1. The exciting directions of a and b are opposite from each other and hence, vectors of a change in magnetic flux linked to b, as shown in FIG. 25B, are in directions opposite from each other, and the magnitude of an electromotive force which is a resultant vector is 2.

In this way, when the pitch of the winding is not 180°, the electromotive force is smaller even with the same number of turns of the winding and the same change in magnetic flux, as compared with a case where the pitch is 180°, and if a coil pitch is represented by $\beta\pi$, a proportion is given according to the following equation:

$$kp = \sin(\beta\pi/2)$$

The coefficient kp is called a short-pitch winding coefficient.

The short-pitch winding coefficient assumes a maximum value equal to 1 in a case of a wave winding at a coil pitch $\beta\pi=180°$, but if the wave winding is employed as a concentrated winding, a distribution of a magnetomotive force is of a rectangular wave shape, as shown in FIG. 26A. Therefore, a core loss due to a torque ripple or a high frequency can be reduced by increasing the number of slots to ensure that the distribution of the magnetomotive force is nearer to a sine wave shape, namely, by employing the wave winding as a distributed winding, as shown in FIG. 26B.

When the distributed winding is employed, the distribution of the magnetomotive force is nearer to the sine wave shape, but a basic wave component is decreased by $$kd = \sin(q\alpha/2)/\{q\sin(\alpha/2)\}$$

wherein q represents a number of distributed slots and $\alpha$ represents a distribution pitch. The coefficient kd is called a distributed winding coefficient.

Other embodiments of refrigerant passages J in a stator 19 will be described below with reference to FIGS. 28A and 28B.

In the embodiment shown in FIG. 28A, a common refrigerant passage J is provided astride first to fourth stator rings 31 to 34 of a stator 19. Therefore, it is necessary to take the sealing of a mating face of the stator 19 into consideration, but a reduction in cost can be achieved to a degree corresponding to the fact that a core is not required in the molding of a green compact, as compared with a case where a plurality of independent refrigerant passages J are provided in first to fourth stator rings 31 to 34. Moreover, it is possible to increase the sectional area of the passage and to simplify a pipe for supplying a refrigerant.

In the embodiment shown in FIG. 28B, refrigerant passages J are formed by embedding pipes 51 made of a copper alloy having a high heat conductivity during formation of a stator 19 by molding of a green compact. Therefore, a reduction in cost can be achieved, as compared with a case where refrigerant passages are formed using a core.

Yet further embodiments of refrigerant passages J in a stator 19 will be described below with reference to FIGS. 29A to 29D.

The embodiment shown in FIG. 29A is a modification to the embodiment shown in FIG. 28A. In this embodiment, a single refrigerant passage J is formed between an outer peripheral surface of a stator 19 and an inner peripheral surface of an annular stator holder 20 retaining the stator 19. According to this embodiment, it is necessary to take the sealing of mating faces of the stator 19 and the stator holder 20 into consideration, but a core is not required for forming the refrigerant passage J, leading to a reduction in cost.

The embodiment shown in FIG. 29B is a modification to the embodiment shown in FIG. 29A. In this embodiment, a refrigerant passage J is formed by cooperation of recesses formed in both of an outer peripheral surface of a stator 19 and an inner peripheral surface of a stator holder 20 with each other. According to this embodiment, it is possible to ensure a sectional area of the refrigerant passage J, while decreasing the size of the recess in the stator 19 to ensure the strength of the stator 19 and a magnetic path, because the refrigerant passage J is formed by cooperation of the recess in the stator 19 and the recess in the stator holder 20 with each other.

In the embodiment shown in FIG. 29C, an outer peripheral surface of a stator 19 is a simple cylindrical surface, and two reinforcing rings 52, 52 are press-fitted to outer peripheral surfaces of first and fourth stator rings 31 and 34 located on axially opposite sides, while a stator holder 20 is press-fitted to outer peripheral surfaces of the reinforcing rings 52, 52. According to this embodiment, the refrigerant passage J having a larger sectional area can be formed by cooperation of the stator 19, the reinforcing rings 52, 52 and the stator holder 20 with one another, while simplifying the shapes of the stator 19 and the stator holder 20 to the maximum, and moreover, the stator 19 can be reinforced by the reinforcing rings 52, 52.

The embodiment shown in FIG. 29D is a modification to the embodiment shown in FIG. 29A. In this embodiment, two refrigerant passages J, J are formed between two grooves in an outer peripheral surface of a stator 19 and an inner peripheral surface of a stator holder 20. Even according to this embodiment, a functional effect similar to that in the embodiment shown in FIG. 29A can be achieved.

Embodiments, in which a stator 19 is cooled by cooling fins F, will be described with reference to FIGS. 30A to 30C.

In the embodiment shown in FIG. 30A, a plurality of cooling fins F forming an annular shape are projectingly provided on an outer peripheral surface of a stator 19. An outer peripheral surface of the stator 19 cannot be held by an annular stator holder 20 due to the interference with the cooling fins F and hence, opposite sides of the stator 19 are held by plate-shaped stator holders 20, 20.

These cooling fins F are formed simultaneously with the formation of first to fourth stator rings 31 to 34 by the molding of a green compact, leading to a low cost, as compared with a case where cooling fins formed by separate members are fixed subsequently. Moreover, the efficiency of transfer of heat from a body of the stator 19 to the cooling fins F is high, leading to an enhancement in cooling effect. Further, because cooling air is used as a refrigerant, it is possible to disuse a pump, a pipe, a radiator and the like required when a liquid refrigerant is used, and moreover, it is unnecessary to take provision for the leakage of the refrigerant.

In the embodiment shown in FIG. 30B, a plurality of cooling fins F forming an annular shape are projectingly provided on each of a first stator ring 31 and a fourth stator ring 34 which form opposite sides of stator 19. According to this embodiment, the cooling fins F do not exist on an outer peripheral surface of the stator 19 and hence, it is possible to hold the stator 19 by an annular stator holder 20, leading to the simplification of a holding structure.

In the embodiment shown in FIG. 30C, cooling fins F are projectingly provided on an outer peripheral surface and opposite sides of a stator 19. In this case, the number of the cooling fins F can be increased to enhance the cooling effect. In this embodiment, however, it is impossible to hold the stator 19 by the stator holders 20, 20 shown in FIG. 30A or FIG. 30B and hence, the cooling fins F are notched at circumferentially several points on the stator 19, and it is necessary to hold the stator 19 at such points.

Although the embodiments of the present invention have been described in detail, it will be understood that various modifications in design may be made without departing from the subject matter of the invention.

For example, the 2-phase claw pole motor M has been illustrated in each of the embodiments, but the present invention is applicable to a 3 or more-phase claw pole motor.

In each of the embodiments, the claw pole motor M is used as a motor for traveling of a hybrid vehicle, but can be used for any application.

In addition, in each of the embodiments, each of the stator rings 31, 32, 33, 34 and 35 in each phase is formed of the green compact material, but any of various other materials can be employed. More specifically, if each of the stator rings 31, 32, 33, 34 and 35 is formed of any of a solid magnetic material, a sintered material and a green compact material, the molding is facilitated, as compared with a case where they are formed of a laminated steel plate. If the stator ring is formed of a solid magnetic material or a sintered material, the cost can be reduced. If the stator ring is formed of a green compact material, the loss of a magnetic flux can be reduced.

Further, in each of the embodiments, the first to fifth stator rings 31, 32, 33, 34 and 35 in each phase are formed in the monolithic molding, but if the return passes 31a, 32a, 33a, 34a and 35a, the teeth 31b, 32b, 33b, 34b and 35b and the projections 31c, 32c, 33c, 34c and 35c are formed in a divided manner according to need, the degree of freedom for the design thereof can be increased.

Yet further, the straight angle wire having the oblong section is employed for the conductor of each of the windings 36, 37, 38 and 39 in each phase, but a conductor having a regular polygonal section such as a square section and a regular hexagonal section or a circular section can be employed. If the conductor having the oblong section or the regular polygonal section is employed, the space factor for the windings 36, 37, 38 and 39 can be increased, and if the conductor having the circular section is employed, it can contribute to a reduction in cost.

In each of the embodiments, the cooling water and the cooling air which are the lowest in cost has been illustrated as the refrigerant for cooling the stator 19, but any other refrigerant can be used.

What is claimed is:

1. A claw pole motor stator, comprising 2m sets of teeth and 2m−1 of slots disposed alternately in an axial direction (m being a natural number of 2 or more), a plurality of return passes respectively interconnecting the teeth, and windings accommodated in the slots, respectively, the windings each accommodated in the slots spaced apart by m from each other being connected in line, so that exciting directions are opposite from each other, and the phases of magnetic fluxes passed through the teeth being displaced by 360°/N (N=2m) from one another.

2. A claw pole motor stator, comprising 2m+1 sets of teeth and 2m slots disposed alternately in an axial direction (m being a natural number of 2 or more), a plurality of return passes respectively interconnecting the teeth, and windings accommodated in the slots, respectively, the windings each accommodated in the slots spaced apart by m from each other being connected in line, so that exciting directions are opposite from each other, the phases of magnetic fluxes passed through the teeth being displaced by 360°/N (N=2m) from one another, and magnetic fluxes passed through first one of the teeth and 2m+1-th one of the teeth being 2/1 of those passed through the other teeth at the same phase.

3. A claw pole motor stator according to claim 1 or 2, wherein when N=2Km, wherein K is a natural number of 2 or more, K windings disposed continuously are connected in line.

4. A claw pole motor stator according to claim 1 or 2, wherein said teeth have projections displaced in phase by 360°/N from one another.

5. A claw pole motor stator according to claim 4, wherein said projections extend axially along an outer peripheral surface of a rotor.

6. A claw pole motor stator according to claim 1 or 2, wherein said teeth have projections of the same phase relative to a rotor having magnetic poles displaced in phase by 360°/N from one another.

7. A claw pole motor stator according to claim 2, wherein first one and 2m+1-th one of the teeth have projections of the same length extending axially along an outer peripheral surface of a rotor.

8. A claw pole motor stator according to claim 1 or 2, wherein said stator includes a cooling structure.

9. A claw pole motor stator according to claim 8, wherein said cooling structure is provided in at least one of the inside and the peripheral portion of the stator.

10. A claw pole motor stator according to claim 9, wherein said cooling structure provided in the peripheral portion of said stator comprises at least one recess, at least one protrusion or a plurality of cooling fins.

11. A claw pole motor stator according to claim 9, wherein said cooling structure provided in the inside of said stator has at least one cooling space.

12. A claw pole motor stator according to claim 11, wherein said cooling space is formed by cooperation of the stator and a holder for said stator with each other.

13. A claw pole motor stator according to claim 11, wherein said cooling space is formed by cooperation of the stator, a holder for said stator, and a reinforcing ring interposed between the stator and the holder.

14. A claw pole motor stator according to claim 8, wherein said cooling structure cools the stator by at least one of cooling water and cooling air.

* * * * *